April 30, 1968   C. M. JONES ET AL   3,381,226
ZERO CROSSING SYNCHRONOUS SWITCHING CIRCUITS
FOR POWER SEMICONDUCTORS Filed May 18, 1965                                10 Sheets-Sheet 1

Inventors:
Clifford M. Jones,
John D. Harnden, Jr.
by Charles W Helzer
Their Attorney.

Inventors:
Clifford M. Jones,
John D. Harnden, Jr.
by Charles W. Helzer
Their Attorney.

Inventors:
Clifford M. Jones,
John D. Harnden, Jr.
by Charles W Hezer
Their Attorney.

Inventors:
Clifford M. Jones,
John D. Harnden, Jr.
by Charles W. Helzer
Their Attorney.

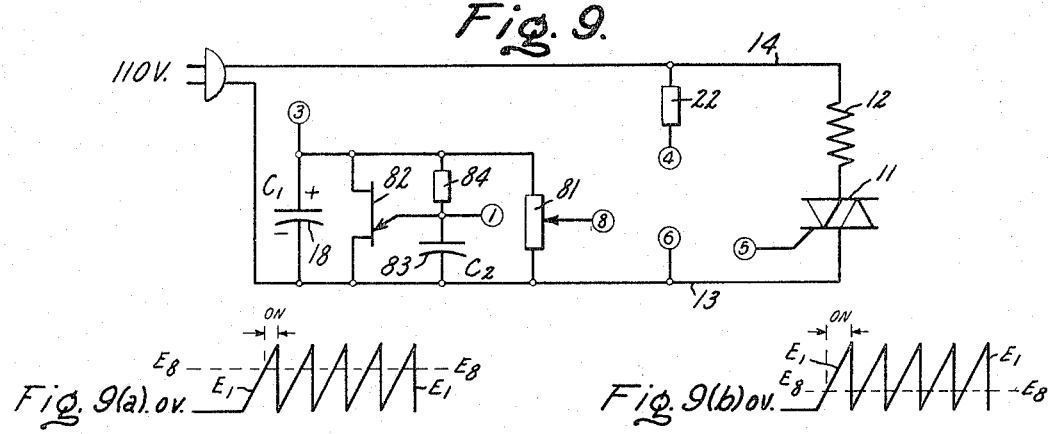
Fig. 9.
Fig. 9(a). Fig. 9(b).
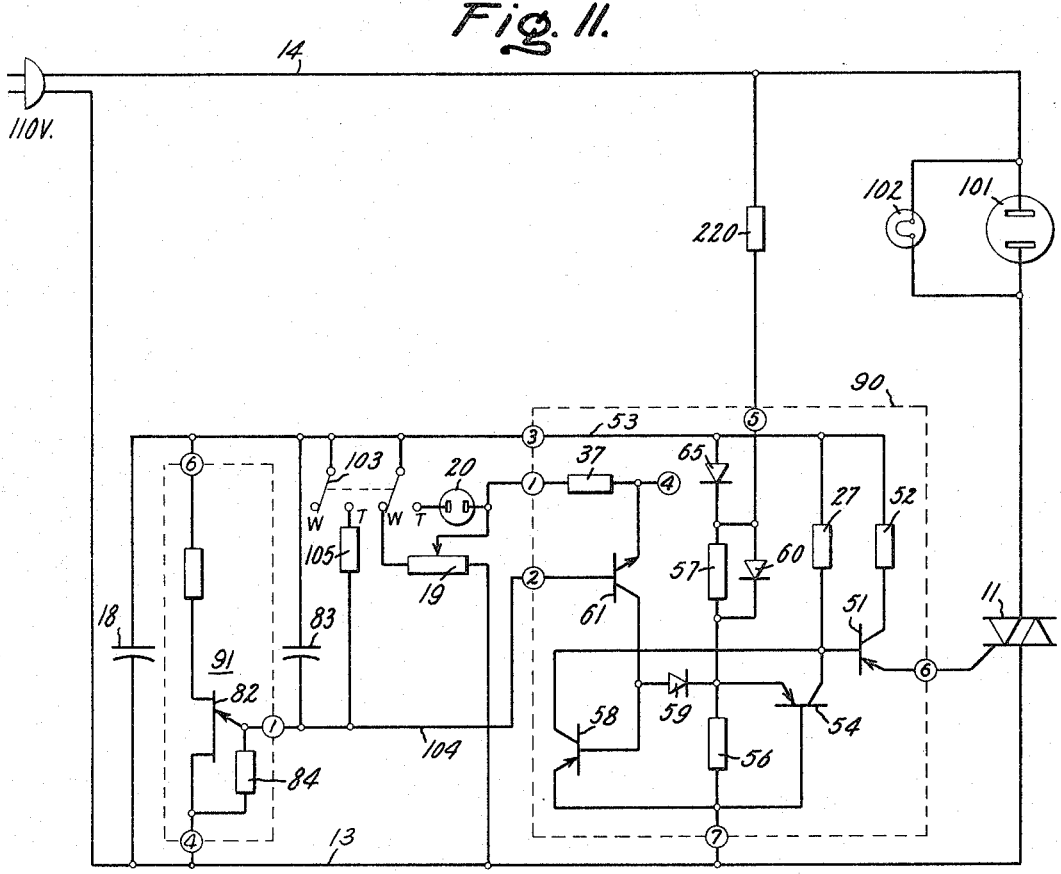
Fig. 11.

Inventors:
Clifford M. Jones,
John D. Harnden, Jr.
by Charles W Helzer
Their Attorney.

Inventors:
Clifford M. Jones,
John D. Harnden, Jr.
by Charles W. Helzer
Their Attorney.

Inventors:
Clifford M. Jones,
John D. Harnden, Jr.
by Charles W Helzer
Their Attorney.

April 30, 1968          C. M. JONES ETAL          3,381,226
ZERO CROSSING SYNCHRONOUS SWITCHING CIRCUITS
FOR POWER SEMICONDUCTORS Filed May 18, 1965          10 Sheets-Sheet 10

(a)

(b)

(c)

(a)

(b)

(c)

*Inventors:*
*Clifford M. Jones,*
*John D. Harnden, Jr.*
by *Charles W Helzer*
*Their Attorney.*

3,381,226
ZERO CROSSING SYNCHRONOUS SWITCHING CIRCUITS FOR POWER SEMICONDUCTORS
Clifford M. Jones, Scotia, and John D. Harnden, Jr., Schenectady, N.Y., assignors to General Electric Company, a corporation of New York
Filed May 18, 1965, Ser. No. 456,670
31 Claims. (Cl. 328—3)

This invention relates to new and improved zero crossing synchronous switching power circuits and to improved synchronously operable controls for such circuits.

More particularly, the invention relates to power circuits of the above type employing power semiconductor gate controlled bidirectional conducting devices, and provides improved synchronously operable controls for such power circuits which are capable of being manufactured in integrated circuit form.

The concept of zero crossing synchronous switching of alternating current or full wave rectified power circuits has at this time become accepted as the most feasible approach to the use of power semiconductors for the control of home appliances such as electric ranges, electric frypans, flat irons, etc. Zero crossing synchronous switching requires that current through a load, such as the heating element of a range, flat iron, etc., be established or interrupted as the alternating current or full wave rectified voltage passes through the zero value region. Switching under these conditions reduces radio frequency interference effects to a minimum and eliminates the need for substantial filter circuits. Hence, circuits utilizing this concept are far less expensive, and smaller size and operate more reliably and efficiently than circuits employing classical control techniques.

The interruption of current flow through a power semiconductor during the voltage zero crossing of an applied alternating current or full wave rectified potential presents no problems since the device naturally turns off if the holding current through it drops below a known minimum holding value. Turn-on of a power semiconductor during the voltage zero crossing interval, however, requires that the turn-on control circuit have the capability of sensing the zero crossing interval, and then turn-on the power semiconductor only during this interval. Such turn-on circuits are known in the art and have been described in the literature. For example, see the article entitled, "RFI-Less Switching With SCR's," by F. W. Gutzwiller, appearing in the EEE-Magazine (the magazine of circuit design), March 1964 issue.

The present invention relates to new and improved zero crossing synchronous switching power circuits employing power semiconductor gate controlled conducting devices, which preferably are bidirectional conducting in their characteristics, and to new and improved low voltage (signal level) synchronously operable control circuits for such power circuits, the synchronously operable control circuits being amenable to manufacture in integrated circuit form for the reasons of cost advantage, size, and reliability.

In order to fabricate the synchronously operable control circuits in integrated circuit form, it is essential that the circuits be designed in such a manner as to reduce to as low a value as possible the power dissipation of the circuit and that the impedance levels fit the "state of the art" requirement. Further, no transformers or inductance can be present in the circuit. This requires that the voltage and current levels within the circuit be maintained as low as possible. If these factors can be overcome, then all the advantages of integrated circuit construction can be made available. These advantages are: increased appel because of its apparent simplicity and small size; lower cost because of the mass production techniques employed in the fabrication of integrated circuits; and improved reliability and serviceability since a damaged integrated circuit unit can be readily replaced with another relatively low cost unit. One of the most important advantages, however, is that the extreme small size of the integrated circuit control, allows the control to be built into the handle or plug of small appliances such as flat irons, fry pans, and other conventional portable appliances in such a manner as to allow completely new design freedom for such appliances.

It is therefore a primary object of the present invention to provide new and improved zero crossing synchronous switching power circuits employing power semiconductor gate controlled conducting devices.

Another object of the invention is the provision of new and improved low voltage synchronously operable control circuits for such power circuits which operate at low voltage and current values, and therefore have low dissipation losses. These circuits are therefore capable of being fabricated in integrated circuit form so that they can be embodied in a simple single unit of small size, low cost and have improved reliability and serviceability.

In practicing the invention, a power control circuit is provided which includes at least one power semiconductor load current carrying gate controlled conducting device (which preferably is bidirectional conducting in its characteristics), and a load connected in series circuit relationship across a pair of power supply terminals that in turn are adapted to be connected across a source of alternating current of full wave rectified potential. Synchronously operable control circuit means are coupled to and control the gate controlled conducting device. The synchronously operable control circuit means comprises means for providing a continuous low voltage signal level gating potential, gating means operatively coupled to the means for providing the low voltage gating potential means and operatively coupled to the control gate of the gate controlled conducting device for applying a gating on signal to the device to cause the same to conduct load current therethrough. Shunt means are operatively coupled to the gating means for shunting the gating means, control means are operatively coupled to at least one of the shunt means for controlling the operation of the said shunt means, and means are operatively coupled to the control means for applying a control signal to the control means to control operation of the control means through the zero value region of the supply potential.

Other objects, features and many of the attendant advantages of this invention will be appreciated more readily as the same becomes better understood by reference to the following detailed description, when considered in connection with the accompanying drawings, wherein like parts in each of the several figures are identified by the same reference character and wherein:

FIGURE 9 is a partial schematic circuit diagram of a new and improved zero crossing synchronous switching alternating current power circuit which provides watts control and which can employ any of the low voltage synchronously operable control circuits illustrated in FIGURES 6–8, but which are designed primarily for use with the control circuit of FIGURE 8;

FIGS. 9a and 9b are diagrams of reference potentials appearing in the circuit of FIG. 9;

FIGURE 11 is a schematic circuit diagram of a universal watts-temperature control circuit constructed in accordance with the invention;

Figure 12:
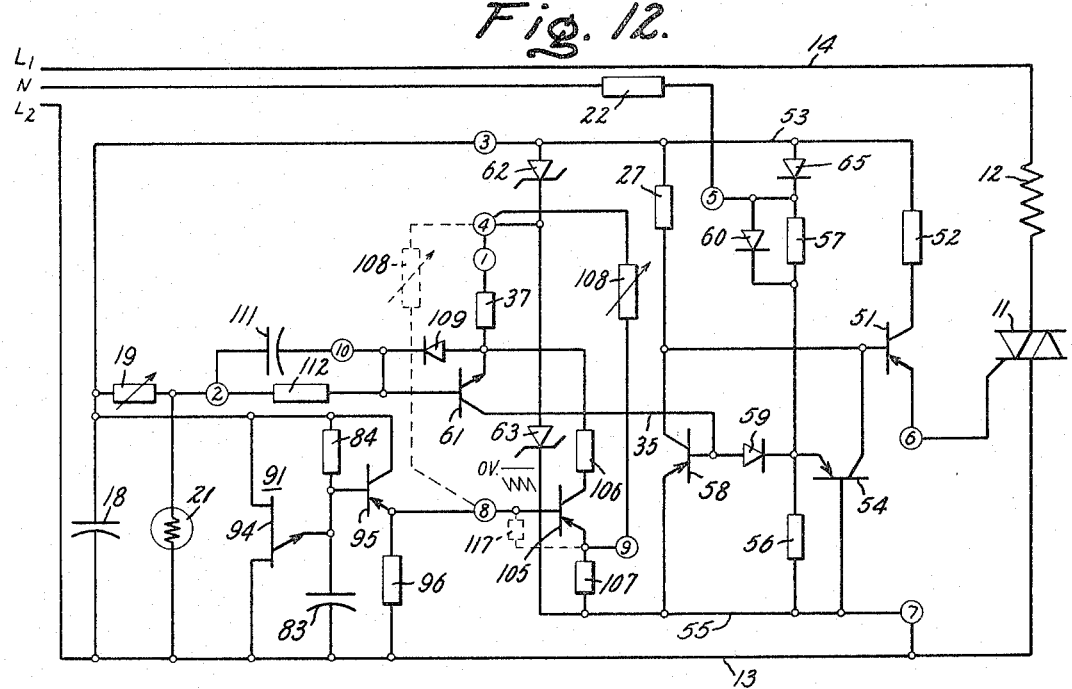
Figure 13:
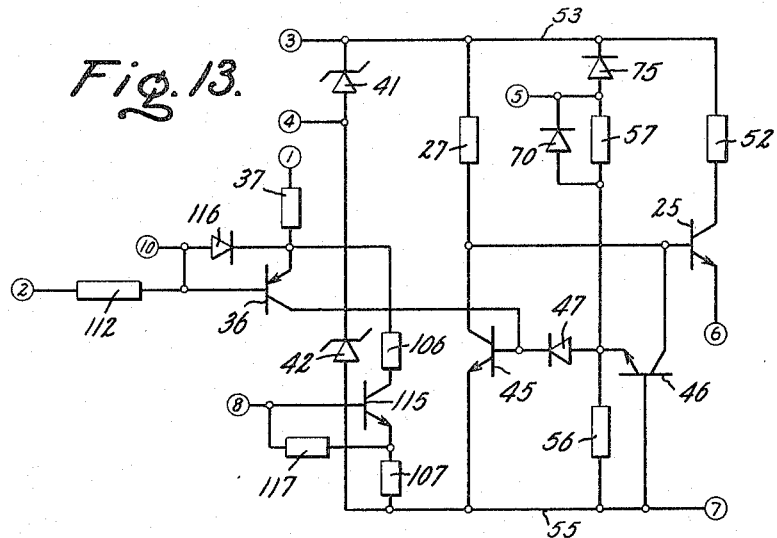
Figure 14:
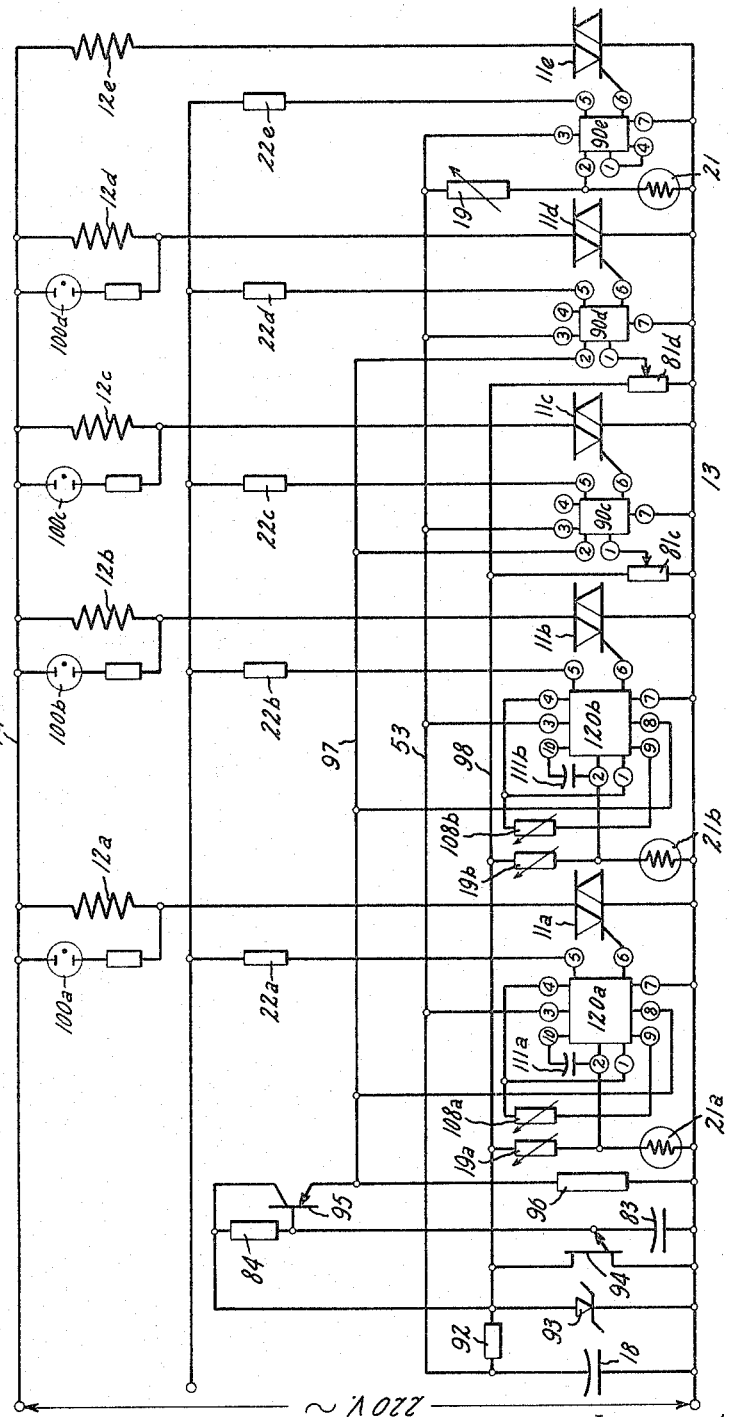
Figure 15:
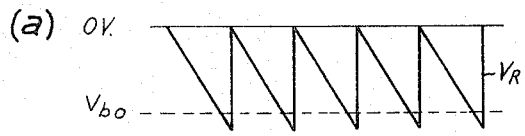
Figure 15:
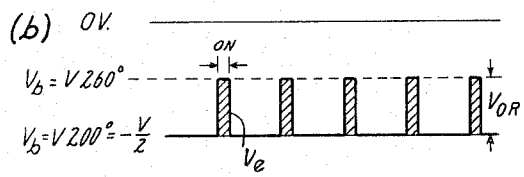
Figure 15:
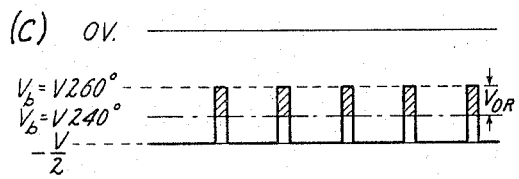
Figure 16:
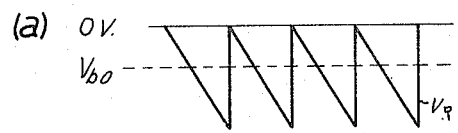
Figure 16:
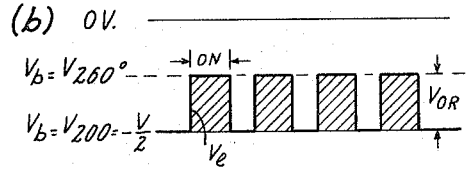
Figure 16:
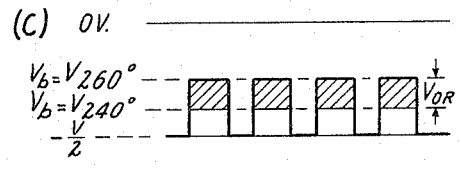

FIGURE 12 is a schematic circuit diagram of a new and improved zero crossing synchronous switching alternating current power circuit suitable for use in controlling a heating element on an electric range, for example, wherein it is desirable to provide temperature control over at least two of the cooking elements, independent watts control of the heating element through the temperature range associated with the boiling temperature of water, and an automatic override in the event of a boil-dry to prevent pan damage, etc.;

FIGURE 13 is a schematic circuit diagram of a modified form of low voltage synchronously operable control circuit that could be employed in the power circuit of FIGURE 12;

FIGURE 14 is a schematic circuit diagram of a zero crossing synchronous switching alternating current power circuit used on an electric range wherein the boil control function is provided for certain of the load elements; and FIGURES 15 and 16 are a series of voltage versus time characteristic curves illustrating the mode of operation of the synchronously operable control circuits shown in FIGURES 12 and 13.

Figure 1:
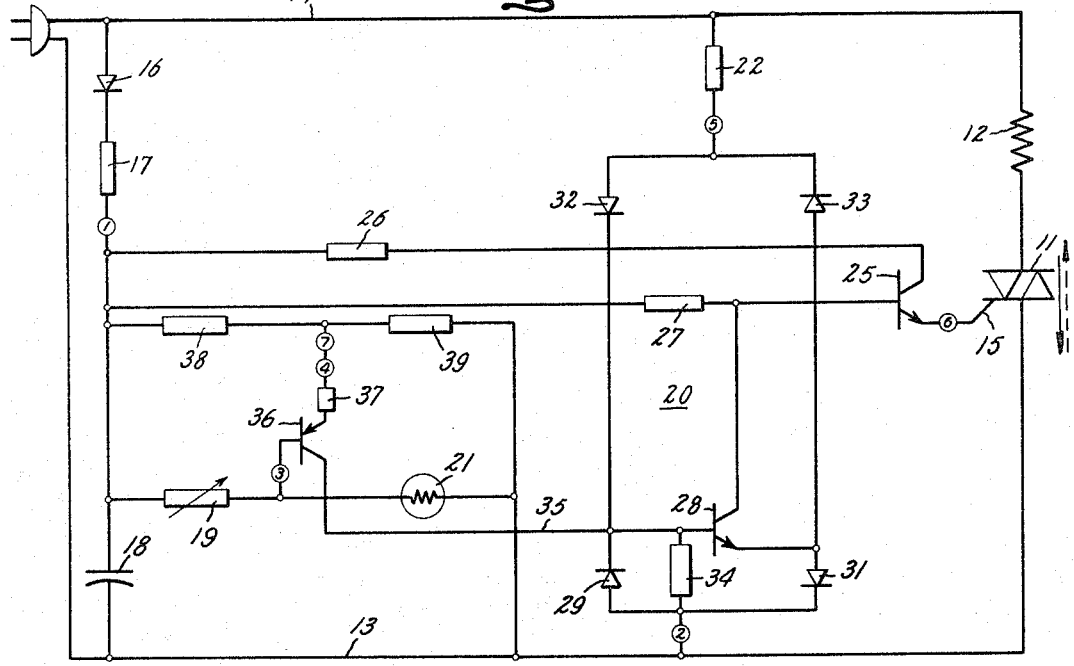
FIGURE 1 is a schematic circuit diagram of a new and improved zero crossing synchronous switching alternating current power circuit (and alternative arrangements) suitable for use in controlling a resistive heating appliance such as a flat iron, for example, and constructed in accordance with the present invention.

The new and improved zero crossing synchronous switching alternating current power circuit shown in FIGURE 1 is comprised by a power semiconductor gate controlled bidirectional conducting device 11 connected in series circuit relationship with a load 12 such as a heating element across a pair of power supply terminals 13 and 14. Power supply terminals 13 and 14 are designed so that they can be easily adapted to be connected across a conventional 50–60 cycle, 120 or 240 volt alternating current power source by means of standard commercial conductor cords or the like. The gate controlled bidirectional conducting device 11 preferably comprises a triac, gated biswitch, a quadrac, a symistor, or some other similar device. The triac is a commercially available gate controlled bidirectional conducting switch manufactured and sold by the Semiconductor Products Department of the General Electric Company located in Auburn, N.Y. For a description of the triac, reference is made to Application Note 200.35, issued February 1964, entitled "Triac Control for A.C. Power," by E. K. Howell, published by the Rectifier Components Department (now part of the Semiconductor Products Department) of the General Electric Company, located in Auburn, N.Y. See also the article entitled "Bilateral SCR Lets Designers Economize on Circuitry," appearing in the Jan. 20, 1964 issue of Electronics Design Magazine. The quadrac is a bilateral switching device having many characteristics similar to the triac, as is the symistor which is a device manufactured and sold in France. While a more detailed description of the characteristics of a triac, etc., can be obtained from the above-referenced articles, the following description is thought to be adequate for the purpose of this disclosure. The triac can conduct current in either of two directions depending upon the polarity of fthe potential across its load terminals. Accordingly, if the potential of supply terminal 14 is positive with respect to the terminal 13, triac 11 will conduct current in the direction of the solid arrow. If on the other hand, the potential of terminal 13 is positive with respect to the potential of terminal 14, triac 11 will conduct current in the direction of the dotted arrow. The bidirectional conducting device can be triggered into a conducting state by a low voltage signal level gating signal applied to its control gate element shown at 15. Once it is triggered into conduction, the triac remains conducting until the current flowing through the device is reduced below a known minimum holding current value. This is known as its latching characteristic since it is similar in effect to a latching relay. The triac is turned off automatically by the alternating current passing through the zero value region. In this region the current through the triac drops below the minimum holding value so that the device automatically turns off.

In order to reduce radio frequency interference effects, the triac 11 is turned on by a low voltage synchronously operable control circuit 20 connected to its control gate, to be described more fully hereinafter in conjunction with FIGURES 2 and 3. With this circuit, load current flow through the heating element 12 can be controlled. In order to energize the synchronously operable control circuit, rectifying means are included for providing a low voltage signal level gating potential for the synchronously operable control circuit 20. In the embodiment of the invention shown in FIGURE 1, this rectifying means comprises a diode 16, load resistor 17, and a filter capacitor 18 connected in series circuit relationship across the power supply terminals 13 and 14. In addition to the rectifying network, an adjustable temperature sensitive means is provided for sensing the temperature of the heating element 12 and controlling the turn-on time of the triac 11 in response to the temperature indication derived. This adjustable temperature sensitive means comprises a variable resistor 19 and a thermistor 21 connected in series circuit relationship across the filter capacitor 18 of the rectifying network. The thermistor is a commercially available temperature sensitive resistor whose resistance value normally changes with changes in temperature of the thermistor. In addition to these eelments, a voltage dropping resistor 22 is provided for supplying an alternating current reference potential to the synchronously operable control circuit.

While it is intended that the new and improved power circuit comprising the present invention and the synchronously operable control circuit therefor are to be used with an alternating current supply potential across the power supply terminals 13 and 14, it can also be used with a rectified direct current supply potential.

Figure 1A:
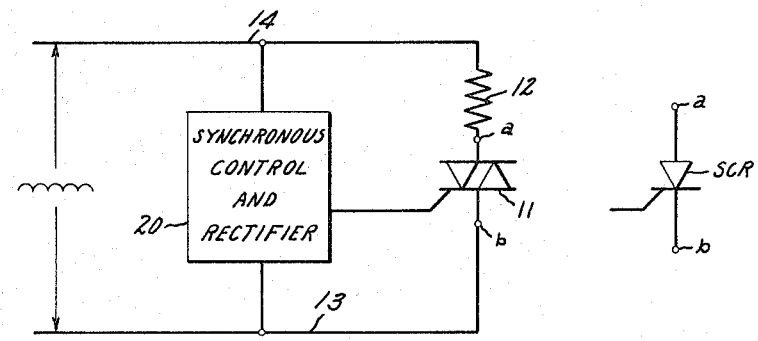
FIG. 1a is a schematic circuit diagram illustrating the use of the power circuit with a full wave rectified supply potential.

FIGURE 1a of the drawings illustrates the circuit used with a full wave rectified supply potential applied across the power supply terminals 13 and 14. With such a supply potential, the gating signal developed by the synchronous control and its rectifier circuit shown at 20 will serve to gate on the triac 11 to cause the triac to conduct load current through the load 12 in only one direction. Thus it would be possible to substitute a unidirectional conducting device such as a conventional SCR shown to the right of triac 11 in place of the triac 11 where the supply potential has previously been full wave rectified as shown in FIGURE 1a.

Figure 1B:
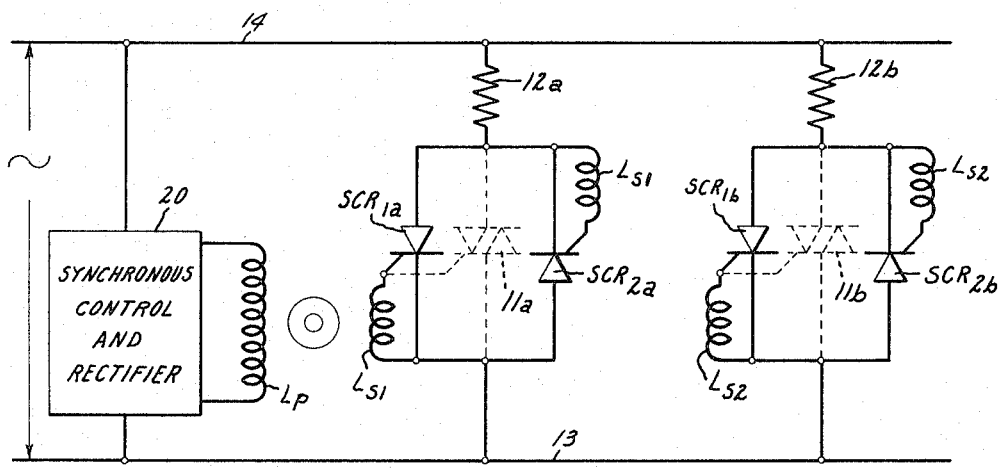
FIG. 1b is a schematic circuit diagram of the power circuit showing the substitution of conventional SCR's.

FIGURE 1b of the drawings illustrates still another method of practicing the invention, and helps to define more clearly the term bidirectional conducting device. In FIGURE 1b, the synchronous control and its rectifier circuit 20 is shown coupled across the power supply terminals 13 and 14 which have a conventional alternating current supply potential applied thereto. The gating signal developed by the synchronous control circuit 20, however, is applied across the primary winding $L_p$ of a gating transformer. The primary winding $L_p$ of the gating transformer is inductively coupled to a plurality of secondary windings $L_{s1}$ and $L_{s2}$ for applying gating signal pulses thereto. The secondary windings $L_{s1}$ and $L_{s2}$ are in turn operatively coupled to the control gate of a respective associated gate controlled bidirectional load current carrying conducting device which may comprise the triac 11a and 11b, respectively, shown in dotted form. These devices are connected in series circuit relationship with an associated load 12a or 12b, respectively, across the power supply terminals 13 and 14. It is also possible for the gate controlled bidirectional conducting devices to comprise a pair of back-to-back connected conventional SCR's such as $SCR_{1a}$ and $SCR_{2a}$. By connection in this manner, the gating pulses will be applied to the gating electrodes of both of the back-to-back connected $SCR_{1a}$ and $SCR_{2a}$ concurrently, however, since only one of these SCR's will be enabled by the supply potential to conduct load current, that is the SCR which will be fired by the gating pulse. The circuit of FIGURE 1b is intended merely to illustrate that back-to-back SCR's can be readily substituted for triacs (which are the preferred form of bidirectional conducting device) where for example the available current ratings of triacs are not adequate to handle the load currents envisioned. Another way to handle the problem of inadequate current would be to connect several triacs in parallel.

The synchronously operable control circuit comprises a gating means formed by a gating npn junction transistor 25 having its emitter connected to the control gate of triac 11. The collector of gating transistor 25 is connected through a limiting resistor 26 to the rectifying network 16, 18, and its base is connected through a limiting resistor 27 to the rectifying network. The rectifying network 16, 17 and 18 serves to develop a low voltage direct current potential on the order of 10 volts which then is continuously applied across the base-emitter of gating transistor 25 through the medium of the leakage current through the gate of triac 11. Accordingly, these circuit elements can be said to constitute a means for continuously applying a turn-on signal to the gating transistor 25.

In order to control operation of the gating means, first and second shunt means are provided which are comprised by an npn junction transistor 28 and a diode rectifier bridge formed by a plurality of diodes 29, 31, 32 and 33. The diodes 29 and 31 have their cathode and anode, respectively, interconnected directly to the power supply terminal 13, and the diodes 32 and 33 have their cathode and anode, respectively, connected through the dropping resistor 22 to the power supply terminal 14. A voltage dividing resistor 34 is connected between the base of the transistor 28 and the power supply terminal 13. The collector of transistor 28 is connected to the base of gating transistor 25, and the emitter of transistor 28 is connected to the anodes of diodes 31 and 33. By this arrangement, it can be appreciated that when the power supply terminal 14, for example, is positive with respect to terminal 13, there is a shunt path through resistor 22, diode 32, the emitter-base of transistor 28 and diode 31 to terminal 13. This results in turning "on" transistor 28 which in its "on" condition shunts the gating current normally applied to the base of gating transistor 25. This shunt path is to terminal 13 in parallel with the gate-cathode of triac 11, and hence prevents turn-on of triac 11. Similarly, during the half cycle while the terminal 13 is positive with respect to the terminal 14, there is a shunt path established through the diode 29, the base-emitter of transistor 28, diode 33 and resistor 22 which again causes the transistor 28 to turn on. This results in again shunting turn-off current from the base of the gating transistor 25 preventing it from gating on triac 11. Accordingly, it can be appreciated that each of the paths traced out above constitutes first and second shunting means for shunting gate current from the triac 11 during the alternate half cycles of the alternating current supply potential.

Figure 2:
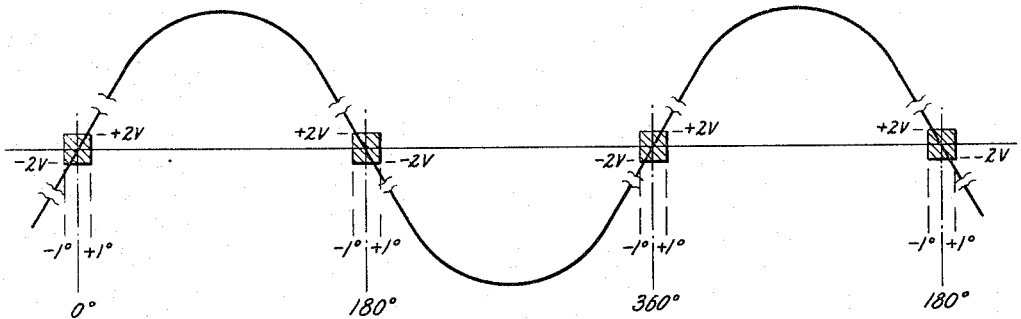
FIGURE 2 is a voltage vs. time characteristic curve for a conventional 60 cycle alternating current potential indicating the regions wherein the synchronous switching function occurs for the circuit shown in FIGURE 1 (as well as other circuits to be described hereinafter)

Referring now to FIGURE 2 of the drawings, the voltage versus time characteristics of a conventional 60 cycle, 120 volt alternating current potential is illustrated. It can be appreciated that between the zero value regions of each alternating half cycle, that the shunt paths traced out above will cause turn-on of the transistor 28. This will prevent any possible gating-on of the triac 11 during the intervals while there is any substantial potential on the terminals 13 or 14. It is only in the zero value region while the alternating current potential is passing through its zero value that there is insufficient potential, determined principally by the values of resistors 22 and 34, applied through either of the shunt paths described above to turn-on the transistor 28. It might be noted that the zero value region is defined to be about plus or minus two volts and/or plus or minus 1° of the zero crossing; however, the zero value region does not have to be symmetrical but is shown that way for convenience. By appropriate phase shift techniques, it would be possible to employ only the region immediately following the zero crossing.

If no external control is applied to the base of transistor 28 while the alternating current potential is passing through its zero value region, this transistor would normally block and a gating-on pulse would be applied through the gating transistor 25 to the gate of triac 11. However, an external control signal is applied over the conductor 35 to the base of transistor 28 for controlling externally the turn-on of this transistor through the zero value region of the supply alternating current potential. The conductor 35 is connected to the output of a control means which comprises a PNP junction control transistor 36 having its collector electrode connected directly to the conductor 35. The emitter of control transistor 36 is connected through a current limiting resistor 37 to a voltage dividing network comprised by a resistor 38 and resistor 39 connected in series across the filter capacitor 18. The base of control transistor 36 is connected between the junction of the variable resistor 19 and thermistor 21. By this arrangement, the variable resistor 19 can be adjusted to cause the control transistor 36 to turn-on and apply a positive gating potential to the base of the transistor 28 at any desired temperature as measured by the thermistor element 21. It of course goes without saying that the thermistor element 21 is thermally coupled to the load 12 whose temperature it is desired to control. The temperature of the load element 12 of course is in turn controlled by the number of half cycles current pulses supplied through it by triac 11. Since the load 12 can comprise any form of heating load such as a flat iron, electric fry pan, home heating unit, a lamp flasher, etc., the universality of the control can be appreciated. Further, although the new and improved circuits are described primarily in connection with resistive heating loads, they can be used in connection with inductive loads if appropriate power factor correction techniques are employed.

With the circuit of FIGURE 1 in operaiton, if it is desired to have the flat iron or other appliance represented by load 12 operate at a temperature of say 120° F., the variable resistor 19 is adjusted to read this value. With the circuit thus adjusted, and assuming the heating element 12 to be starting at room temperature of about 60° F., then the thermistor 21 (which has a negative temperature coefficient of resistance) will possess greater resistance than the adjusted value of the variable resistor 19. Under these conditions, a positive potential will be applied to the base of the control transistor 36. Since this transistor is a PNP transistor, it will be maintained turned-off, and no potential will be coupled through the conductor 35 to the base of the transistor 28. As a consequence of this condition, during the zero crossing interval depicted in FIGURE 2, when the potential on the terminals 13 and 14 drops to essentially zero value or within the minus 2 volt-plus 2 volt range depicted in FIGURE 2, there will be no potential available to raise the potential of the base of transistor 28 positive with respect to its emitter. Hence the transistor 28 will be maintained in its off condition. If the transistor 28 is maintained off through the zero crossing interval, the current supplied through resistor 27 to the base of gating transistor 25 will cause gating transistor 25 to turn on so that a gating pulse is applied to the gate of triac 11 causing it to turn on. Upon the triac 11 turning on, all of the supply potential will appear across the load 12 causing load current flow through the load.

Upon the heating element 12 reaching the pre-set temperature determined by the setting of variable resistor 19, the resistance of the thermistor 21 will have decreased (due to its negative temperature coefficient) to a value such that a negative turn-on potential is applied to the base of the control transistor 36. Upon control transistor 36 being turned on, it will apply a positive turn-on signal through the conductor 35 to the base of the transistor 28. As long as this condition prevails, there will be a continuously applied turn-on signal to the base of the transistor 28 which will maintain this transistor turned on, even through the zero crossing region of the supply alternating current potential. As a consequence, the continuously applied low voltage D.C. turn-on potential to the gating transistor 25 will be shunted away from this transistor even through the zero crossing region so that the gating transistor 25 cannot turn on triac 11. This condition will continue until the heating element 12 calls for more heat through the thermistor 21 whereupon the mode of operation first described will be reverted to. Thus it can be appreciated that the circuit provides all of the advantages obtainable with zero crossing synchronous switching insofar as reduction of radio frequency interference is concerned, and requires no filtering stages. Additionally, because of the provision of the separate source of continuously available, low voltage signal level direct current gating potential, zero crossing synchronous switching can be achieved while the supply voltage is in the vicinity of ±2 volts. Thus switching is achieved at lower voltages than is possible with existing zero crossing synchronous switching circuits, and considerably reduces lamp flicker of electric lights that are energized from the same source of supply potential.

Figure 3:
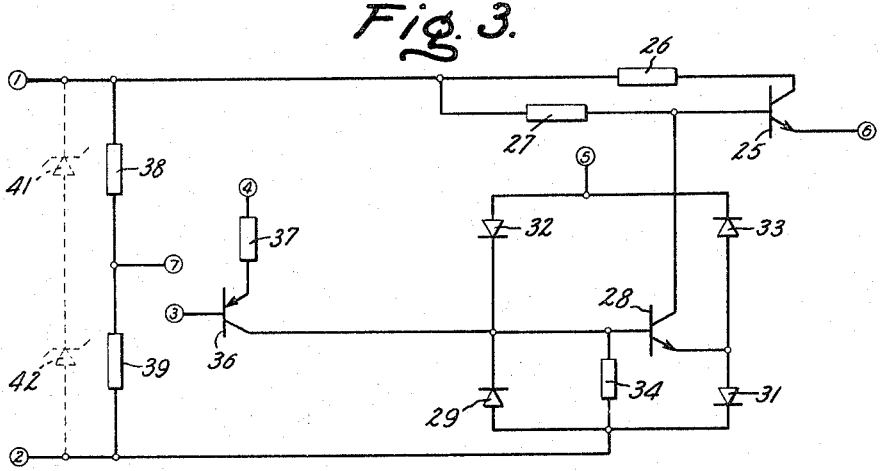
FIGURE 3 is a schematic circuit diagram of the low voltage synchronously operable control circuit portion of the power circuit shown in FIGURE 1.

The synchronously operable control circuit employed in the alternating current power circuit of FIGURE 1 is again illustrated in FIGURE 3 of the drawings separated from its connection to the rectifying network and alternating current power circuit. As can be determined from an examination of FIGURE 3, this synchronously operable control circuit is comprised of a number of interconnected resistors, diodes, and transistors all of which are designed to operate with low voltages and low current values. The circuit requires no inductors or transformers, and its impedance is compatible with the impedances of state of the art switching devices with which the circuit is used. Hence, the circuit requires very little power dissipation, and can be readily matched to existing switching devices. The conductive leads to various points of the circuit have been brought out at terminal points marked with the lower case numbers 1–7. By the use of suitable solder connections or the like, these terminal points can be connected into circuit relationship with the other elements of the alternating current power circuit in the manner illustrated in FIGURE 1. Since the operation of the synchronously operable control circuit was described fully in connection with FIGURE 1, a further description thereof is believed unnecessary.

Because of the characteristics listed above of the synchronously operable control circuit shown in FIGURE 3, it is possible for this circuit to be fabricated in integrated circuit form. Since the construction techniques for the fabrication of integrated circuits are now well established, and such circuits are offered for sale to circuit designers by a number of integrated circuit manufacturers such as the Semiconductor Products Department of the General Electric Company, it is not believed necessary to describe in detail how the circuit in FIGURE 3 would be constructed in integrated circuit form. It is believed sufficient to point out that the entire circuit shown in FIGURE 3 can be placed on a single silicon or possibly germanium chip which is no more than a few millinches in length and breadth and something less than a few millinches in thickness. In fact some 300 or more such circuits can be fabricated on a single silicon wafer one inch in diameter and less than a few mils thick. These circuits are manufactured by use of masking techniques well known in the photo etching art, and hence can be mass produced at very low cost for a given integrated circuit unit such as might be characterized by the circuit configuration of FIGURE 3. Additionally, by fabricating circuits in this manner, they are integral units, and their reliability is greatly improved. Hence, it can be appreciated that by designing this circuit in a manner such that it can be fabricated in integrated circuit form, the circuit can be embodied in a simple, single unit of extremely small size, having very low cost and improved reliability. Because of its very low cost, in the event that any part of the unit should fail in service, no trouble at all is involved in pulling out an entire unit, discarding it, and replacing it with a similar new replacement unit. Hence, circuits fabricated in this manner have greatly improved serviceability.

It might be noted that in addition to the main elements of the synchronously operable control circuit shown in FIGURE 3, the resistor divider comprised by the resistors 38 and 39 are also placed on the integrated circuit chip and provided with a suitable access terminal 7 for connection into the main synchronously operable control circuit. It would have been possible to fabricate the circuit in a manner such that the resistor 37 is directly connected to the voltage dividing resistors 38 and 39, however, fabrication in such a manner would destroy some of the general applicability of the control circuit so that it could not be used with other types of control signal sensors such as the watts control to be described hereinafter. Also, it might be noted that as an alternative to the series connected voltage dividing resistors 38 and 39, a pair of series connected voltage dividing Zener diodes 41 and 42 (shown in dotted line form) could be employed with equal facility. As a matter of fact, depending upon the particular integrated circuit fabrication technique employed to build the circuit, it might even be cheaper and more desirable to build the Zener diode arrangement than to use the resistors 38 and 39.

Figure 4:
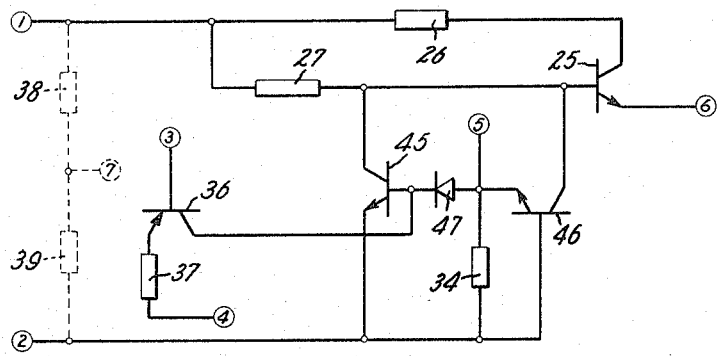
FIGURE 4 is a schematic circuit diagram of an alternative form of a low voltage synchronously operable control circuit constructed in accordance with the invention, and suitable for use in the power circuit arrangement of FIGURE 1.

FIGURE 4 of the drawings illustrates a different and preferred form of synchronously operable control circuit constructed in accordance with the invention. The control circuit shown in FIGURE 4 similarly is suitable for fabrication in integrated circuit form, and is somewhat simpler than the circuit of FIGURE 3 in that it substitutes two transistors 45 and 46 and a blocking diode 47 for the diode bridge and transistor 28 of the circuit shown in FIGURE 3. The operation of the circuit shown in FIGURE 4 can be better understood in conjunction with the description of operation of the circuit shown in FIGURE 7 of the drawings, and following the description of the circuit shown in FIGURES 5 and 6.

Figure 5:
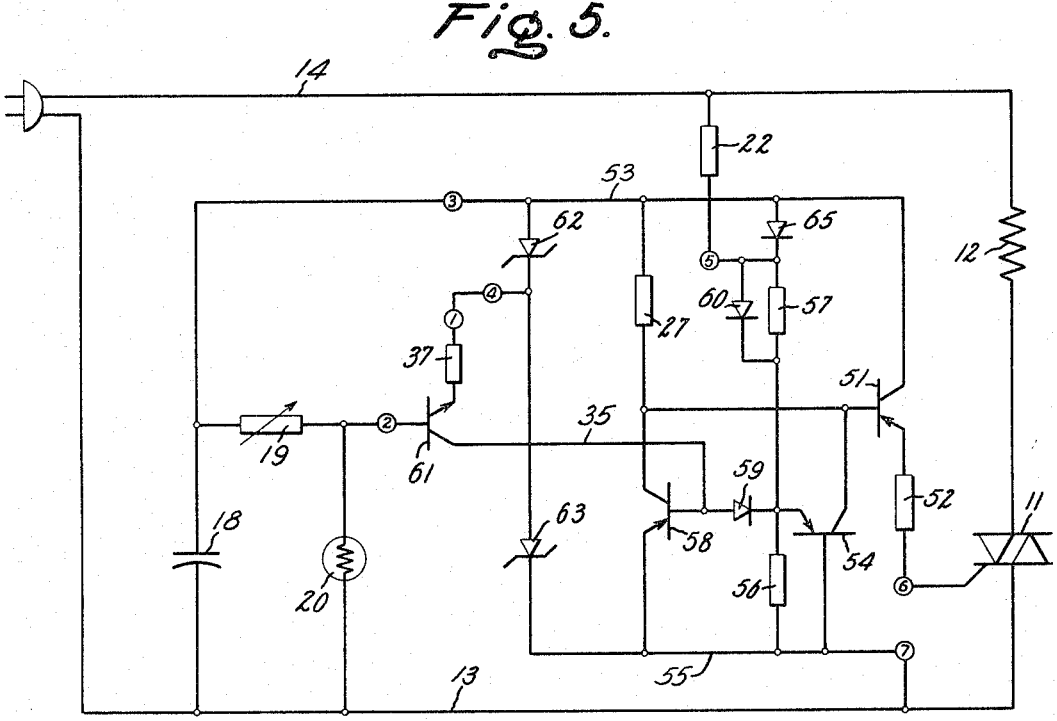
FIGURE 5 is a schematic circuit diagram of a different form of zero crossing synchronous switching alternating current power circuit suitable for temperature controlling an appliance such as an electric fry pan, and constructed in accordance with the invention.

FIGURE 5 of the drawings illustrates a zero crossing synchronous switching alternating current power circuit which in many respects is similar to the circuit of FIGURE 1. The circuit of FIGURE 5 differs from the FIGURE 1 circuit, however, in the design of the rectifying means for deriving the low voltage direct current gating potential, and in the construction of the synchronously operable control circuit. The synchronously operable control circuit used in the arrangement of FIGURE 5 is comprised by a PNP junction gating transistor 51 having its emitter connected through a limiting resistor 52 to the control gate of the triac 11. The collector of the gating transistor 51 is connected to a terminal 53 for supplying a low voltage signal level direct current turn-on signal to the gating transistor. For this purpose, the base of the gating transistor is connected through a limiting resistor 27 to the low voltage direct current terminal 53. A first shunt PNP junction transistor 54 has its collector connected directly to the base of the gating transistor 51 and its base connected to the terminal 55 of the low voltage direct current potential source which is opposite that terminal to which the base of the gating transistor 51 is connected. The emitter of the first shunt transistor 54 is connected to the junction of a pair of voltage dividing resistors 56 and 57 which are connected in series circuit relationship with the voltage dropping resistor 22 across the alternating current supply terminals 14 and 13. A second shunt PNP junuction transistor 58 has its collector electrode connected directly to the base of the gating transistor 51 and its emitter connected directly to the terminal 55 of the low voltage direct current potential source along with the base of the first shunt transistor 54. The base of the second shunt transistor 58 is connected through a blocking diode 59 to the first voltage dividing network comprised by resistor 56 in common with the emitter of the first shunt transistor 54. A shunt diode 60 is connected in parallel with resistor 57 for a purpose to be described more fully hereinafter.

With the above arrangement, the following shunt paths can be traced out. Assume that the terminal 14 is positive with respect to the terminal 13, due to the alternating current supply potential, then a path can be traced through the series connected voltage dividing resistors 22 and 56, and shunt diode 60 which will apply a positive potential to the emitter of the first shunt transistor 54. The shunt diode 60 bypasses resistor 57 with this polarity supply potential so as to assure adequate drive for the emitter of transistor 54. The result is to drive the emitter of 54 positive with respect to the base so that this transistor will be turned on. Turn-on of the first shunt transistor 54 will shunt turn-on current away from the base of the gating transistor 51 so that the gating transistor cannot be turned on and remains in its non-conducting blocking condition. With the gating transistor 51 in its blocking condition, the triac 11 will not be gated on. Similarly, during the alternate half cycle while the terminal 13 is positive with respect to the terminal 14, a negative bias signal developed across the voltage dividing resistor 56 will be coupled through the blocking diode 59 to the base of the second shunt transistor 58 which will cause this transistor to be turned on. Again, with the second shunt transistor turned on, the low voltage turn-on current will be shunted from the base of the gating transistor 51 again preventing turn-on of triac 11.

As explained previously in connection with FIGURE 2, the above shunting conditions prevail throughout the complete alternate half cycles of the supply alternating current potential. It is only when the alternating current potential is passing through its zero value region that the two shunt transistors 54 and 58 will revert to their blocking condition in the absence of an external control signal due to the fact that in this region there is no turn-on signal appearing across resistor 56. The external control signal is applied through a conductor 35 to the base of the second shunt transistor 58 from a control means comprised by a control NPN junction transistor 61. The control transistor 61 has its emitter electrode connected through a current limiting resistor 37 to the junction of a pair of voltage dividing Zener diodes 62 and 63 which are connected in series circuit relationship across the low voltage direct current terminals 53 and 55. The collector of the control transistor 61 is connected directly through conductor 35 to the base of the second shunt transistor 58 for controlling its operation. The base of the control transistor 61 is then connected to a means for applying a control signal to the control transistor for controlling its operation. In the arrangement shown in FIGURE 5, this means comprises the terminal 2 which is connected to the junction of the variable resistor 19 and the thermistor 20. Similar to the arrangement of FIGURE 1, the thermistor 20 is thermally coupled to the load heating element 12, and therefore varies its resistance in response to the temperature of the load heating element 12. As a consequence of this arrangement, it can be seen that a variable magnitude direct current control signal will be applied to the base of the control transistor 61 which will cause this transistor to turn on and off with the response to the need for heating current through the load heating element 12.

In addition to the above-described components, rectifying means are provided for deriving the desired low voltage direct current potential applied between the terminals 53 and 55. This rectifying means comprises a rectifying diode 65 having its anode connected directly to the terminal 53 and having its cathode connected to the junction between the resistors 22 and 57. By reason of this arrangement, a rectifying series circuit can be traced through the resistor 22, diode 65, and filter capacitor 18 which will result in deriving the desired low voltage direct current potential across the filter capacitor 18. This potential then appears between the terminals 53 and 55.

In operation, the synchronously operable control circuit of FIGURE 5 will function as follows. Again it should be remembered that turn-on of the triac 11 can be achieved only during the zero crossing interval of the supply alternating current potential. During substantially all of each alternate half cycle of the A.C. supply potential either the first shunt transistor 54 or the second shunt transistor 58 will be turned on by the overriding potential applied to their emitter or base, respectively, by the voltage dividing network 22, 57 and 56. However, while the supply alternating current potential is passing through the zero value region (that is, while it is within about one degree on either side of the zero value or about plus or minus 2 volts above the zero value), a gating on pulse can be applied to the triac 11 provided that the first and second shunt transistors 54 and 58 remain in their non-conducting blocking condition. Since there is no way with the arrangement of FIGURE 5 to externally control the first shunt transistor 54, it will always remain in its non-conducting blocking condition during the zero crossing interval. However, since the second shunt transistor 58 has an external control signal applied to its base from the control transistor 61, whether or not the second shunt transistor 58 remains in its non-conducting blocking condition is determined by the condition of the control transistor 61. In the event that the control transistor 61 is turned on, it will apply a negative gating potential to the base of the second shunt transistor 58 causing this transistor to turn on even while the supply alternating current potential is passing through its zero value region. In this eventuality, turn-on current to the gating transistor 51 will continue to be shunted away from the base of the gating transistor preventing this transistor from turning on, and results in leaving the triac 11 in its non-conducting blocking condition.

In the event that the control transistor 61 is turned off by the control signal applied thereto from the thermistor 20 and adjustable resistor 19, then the second shunt transistor 58 will revert to its non-conducting blocking condition while the supply alternating current potential passes through the zero value region. With both shunt transistors 54 and 58 in their blocking non-conducting condition, the base of the gating PNP junction transistor 51 is driven negatively with respect to its emitter electrode so that it conducts and applies a gating on pulse to the gate of the triac 11. As a consequence, the triac 11 will turn on and will conduct through the ensuing half cycle of supply alternating current potential. At the end of this half cycle, the triac 11 will of course revert to its non-conducting blocking condition due to the fact that the current through the device drops below the holding value when the supply alternating current potential again crosses through its zero value. Whether or not the triac 11 will be turned on in the next following half cycle, then of course will again be determined by the condition of the control transistor 61.

Figure 6:
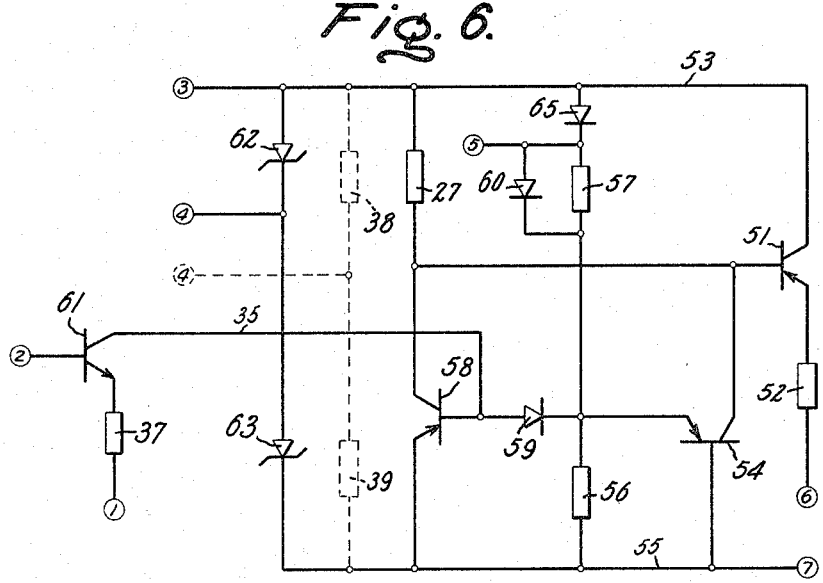
FIGURE 6 is a schematic circuit diagram of the low voltage synchronously operable control circuit employed in the power circuit of FIGURE 5.

FIGURE 6 of the drawings is a schematic illustration of the synchronously operable control circuit used with the circuit arrangement of FIGURE 5 as it would appear if the control circuit were placed in modular or integrated circuit form. Since each of the elements of the circuit in FIGURE 6 have been given the same reference terminal as the corresponding element in the circuit shown in FIGURE 5, and since they function in precisely the same fashion, a further description of the circuit is believed unnecessary. It should be noted, however, that in the circuit configuration of FIGURE 6, not only are the elements of the main synchronously operable control circuits adapted to be fabricated in integrated circuit form, but so also are the Zener diodes 62 and 63 of the D.C. voltage dividing network, and the rectifying diode 65. This illustrates how by proper arrangement of the components of the circuit, it is possible to include within the integrated circuit module as many of the elements of the circuit as possible in order to take the greatest possible advantage of the lower fabrication and assembly cost. Again, if desired, voltage dividing resistors 38 and 39 shown in dotted outline form could be substituted for the voltage dividing Zener diodes 62 and 63.

Figure 7:
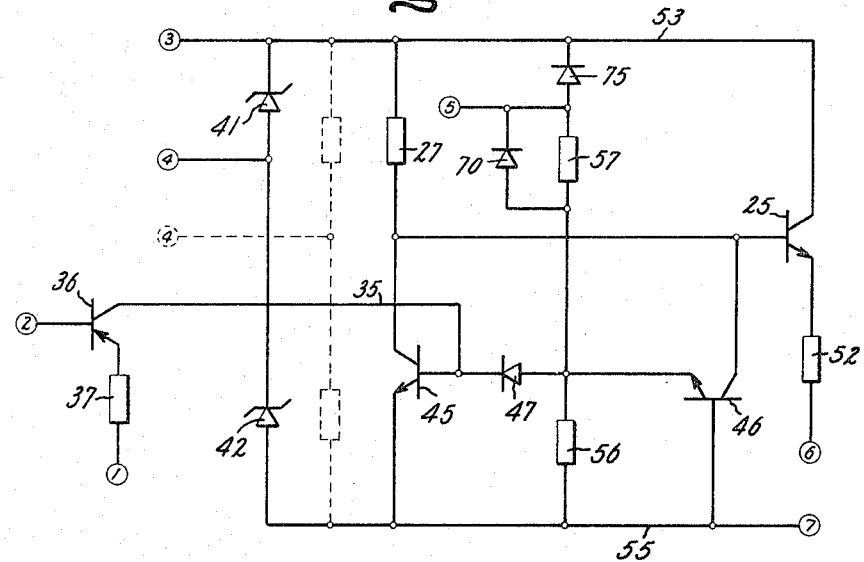
FIGURE 7 is a schematic circuit diagram of an alternative form of low voltage synchronously operable control circuit suitable for use with a power circuit such as shown in FIGURE 1 and FIGURE 5.

FIGURE 7 of the drawings illustrates a different form of the synchronously operable control circuit shown in FIGURE 6 of the drawings. In the form of circuit shown in FIGURE 7, all of the elements of the FIGURE 6 circuit are present, and the circuit differs from the FIGURE 6 circuit only in that different types of active elements are employed. To be particular, in the FIGURE 7, circuit, a NPN junction gating transistor 25 is substituted for the PNP gating transistor 51, a NPN junction first shunt transistor 46 is substituted for the PNP first shunt transistor 54, the second shunt transistor 45 is a NPN junction transistor in place of the PNP junction transistor 58 used in the FIGURE 6 circuit, and the control transistor 36 is a PNP junction transistor instead of the NPN junction transistor 61 used in FIGURE 6. Additionally, each of the diodes 47, 70 and 75 and the Zener diodes 41 and 42 have had their polarities reversed from the diodes employed in the circuit of FIGURE 6. As a consequence of this arrangement, no changes are effected in the basic mode of operation of the control circuit; however, as a result of these changes positive polarity gating pulses will be applied to the control gate of the triac 11 in place of the negative polarity gating pulses derived from the synchronous control circuit of FIGURE 6. There are certain manufacturing advantages to be gained by using NPN junction transistors; however, because of the gating characteristics of triacs which normally operate better with negative gating pulses, the circuit of FIGURE 6 might be preferred under certain circumstances.

From a comparison of the circuit arrangement of FIGURE 7 to the circuit of FIGURE 4, the strong similarities of these two circuits can be noted. As a matter of fact, the two circuits will function identically to develop positive polarity gating pulses for application to a triac or other gate controlled bidirectional conducting device. The only distinctions between the two circuits are that there are fewer elements present in the arrangement of FIGURE 4. This merely serves to illustrate how it is possible by appropriate manipulation of the circuit design to incorporate fewer or more of the elements of a circuit into modular or integrated circuit form. Another distinction that might be noted is that in the circuit of FIGURE 4, the limiting resistor 26 is connected to the collector of gating transistor 25 while in FIGURE 7, the limiting resistor 52 is connected to its emitter. By either construction, the resistor is connected in the emitter-collector circuit of the transistor where it is needed.

Figure 8:
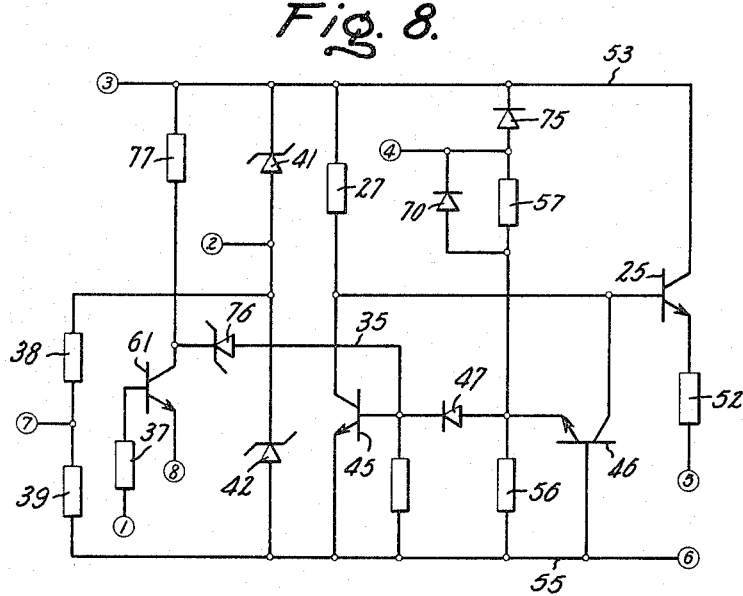
FIGURE 8 is a schematic circuit diagram of still another form of a low voltage synchronously operable control circuit suitable for use with the power circuits such as shown in FIGURES 1 and 5.

FIGURE 8 of the drawings illustrates a modification of the synchronously operable control circuit wherein a NPN junction transistor is used as the control transistor 61. The provision of an NPN junction transistor at 61 in this circuit necessitates an inversion in the overall operation of the circuit resulting in the gating transistor 25 (and hence the load current carrying triac) being on when the control transistor 67 is turned on. This is in contrast to previously described circuits where with the control transistor turned on, the gating transistor is maintained off. Otherwise, to the circuit is similar in construction and operation to the circuit shown in FIGURE 7 and has the additional advantage that all of the transistors employed in the circuit are NPN junction transistors. This provides certain advantages in the fabrication techniques employed in manufacturing the circuit in modular or integrated circuit form. In order to employ a NPN junction control transistor 61 in the circuit arrangement of FIGURE 8, however, it is necessary to also add a Zener diode 76 in the lead 35 and to connect the junction of the Zener diode 76 and collector of control transistor 61 through a voltage dropping resistor 77 to the terminal 53. These elements introduce the inversion mentioned so that with control transistor 61 turned on, the first shunt transistor 45 is maintained off, and vice versa. In all other respects, the circuit of FIGURE 8 is similar in construction and operation to the circuit of FIGURE 7. For the purpose of illustration, a resistor voltage dividing network provided by the series connected resistors 38 and 39 is used in conjunction with a Zener diode voltage dividing network comprised by the series connected Zener diodes 41 and 42. This merely serves to illustrate how, by the provision of appropriate tap-off points such as 2 and 7, reference potentials of any desired value can be obtained.

FIGURE 9 of the drawings illustrates a version of a zero crossing synchronous switching alternating current power circuit which provides variable watts control over the load current supplied to the load 12 by triac 11. The power circuit shown in FIGURE 9 is connected in such a manner that it can be used with the synchronously operable control circuit of FIGURE 8 of the drawings. Thence, if the appropriately numbered terminals carrying the reference numerals 1–8 shown in FIGURE 9 are connected with the similarly numbered terminals of the synchronously operable control of FIGURE 8, a complete power circuit and its control will result. FIGURE 9 is intended to illustrate the ease with which one of the standardized control modules such as that shown in FIGURE 8 can be incorporated into a power circuit however, it should be understood that the circuit of FIGURE 9 could be readily adapted for use with any of the synchronously operable circuits described herein by one skilled in the art.

After proper incorporation of the appropriate control of FIGURE 8 into the circuit of FIGURE 9, it will be appreciated that the capacitor 18 will be charged to a predetermined positive direct current voltage in the neighborhood of 10 volts through the resistor 22 and rectifier 75 shown in FIGURE 8. This voltage is used to energize a relaxation oscillator and a variable resistor 81 that provide an adjustable watts control. The relaxation oscillator is comprised by a unijunction transistor 82 having its base electrodes connected across capacitor 18. The emitter electrode of unijunction transistor 82 is connected to the junction of a resistance capacitance charging network comprised by a capacitor 83 and a resistor 84 connected in series circuit relationship across capacitor 18. It should be noted that this junction and, therefore, the emitter of unijunction transistor 82, is connected to the terminal 1, which as shown in FIGURE 8 is connected through limiting resistor 37 to the base of control transistor 61. The variable resistor 81 is also connected across capacitor 18, and its variable tap point is connected to terminal 8 which as shown in FIGURE 8, is connected to the emitter of control transistor 61. As a consequence of this arrangement, it can be appreciated that the potentials appearing at point 1 and point 8 will control the turn-on time of the control transistor 61, and hence thereby control turn-on of triac 11, and the flow of load current through the load resistor 12.

In operation, the unijunction transistor oscillator comprised by 82, 83 and 84 will operate to develop a saw-tooth waveform reference potential as illustrated by the waveform $E_1$ in FIGURES 9A and 9B of the drawing. This saw-tooth waveform reference potential will have a repetition rate determined primarily by the values of the resistance 84 and the capacitance 83, and by design, has a substantially greater period than the 60 cycle alternating current supply potential but is sufficiently short to be integrated by the load. This saw-tooth waveform reference potential $E_1$ is applied continuously through the terminal 1 to the base electrode of the control transistor 61. Similarly, an operator adjusted steady state reference potential shown as $E_8$ developed by the variable resistor 81 is applied through the terminal 8 to the emitter electrode of control transistor 61. The effect of these potentials can best be appreciated in conjunction with FIGURES 9A and 9B.

From a consideration of FIGURE 9a, it can be seen that the saw-tooth waveform reference potential drives the base of control transistor 61 alternately from near zero value to peak positive value in a saw-tooth waveform fashion. At some point determined by the setting of resistor 81, the potential of the base will be driven negative with respect to its emitter so that the control transistor 61 is turned off. Upon this occurrence, the second shunt transistor 45 will be turned on shunting current away from the gating transistor 25 and preventing further gating pulses from being supplied to the triac 11. For the interval that occures after $E_1$ reaching the level $E_8$, however, it can be appreciated that the control transistor 61 will be maintained in an on condition. Therefore, during this interval, gating pulses are applied synchronous with the zero crossing of the alternating current supply potential to the triac 11 so that load current is supplied to load 12. By adjusting the value of the variable resistor 81 to lower the potential $E_8$ to that shown in FIGURE 9b, the control transistor 61 can be turned on for a greater portion of the saw-tooth waveform reference potential. This results in supplying more current to the load through the triac. By adjusting the value of the resistor 81 to zero volts level, triac 11 can be maintained on continuously, and by adjusting resistor 81 so that $E_8$ attains its full positive value, the triac 11 can be maintained off continuously. In this matter, watts control of the current supply through load 12 can be effected from 0 to 100%. It might be noted that while the circuit of FIGURE 9 employs a unijunction transistor oscillator to derive the desired saw-tooth waveform reference potential, other forms of relaxation oscillators could be used in its stead. For example, devices such as the bilateral switch or the four layer diode could be employed to form the relaxation oscillator.

Figure 10:
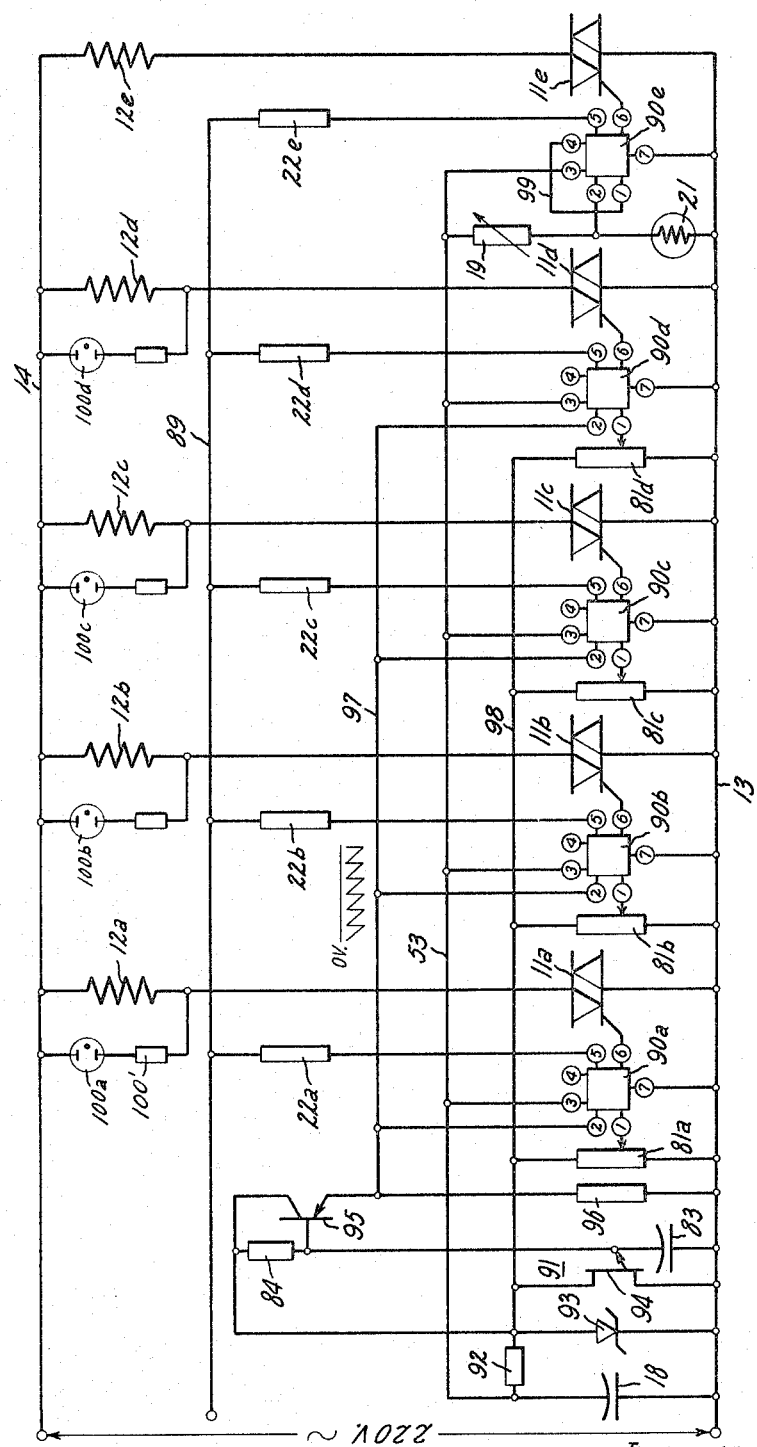
FIGURE 10 is a schematic circuit diagram of a power circuit for an electric range employing the features of the present invention and utilizing the low voltage synchronously operable control circuit of FIGURE 6.

FIGURE 10 of the drawings is a schematic circuit diagram of a complete electric range control having a plurality of heating elements 12a through 12c. The heating elements 12a through 12d are intended to depict the heating elements of the range top units, and the heating element 12e represents the heating element of the oven. Each of the heating elements 12a through 12e is connected in series circuit relationship with an associated load current carrying bidirectional gate controlled conducting device 11a through 11e, respectively, with the series circuits thus comprised being connected in parallel across the power supply terminals 13 and 14. The power supply terminals 13 and 14 are in turn adapted to be connected across the two hot wires of a three-wire 220-volt 60 cycle standard alternating current power supply which also includes a neutral wire 89 to which the neutral terminal or bus of the supply is adapted to be connected. The control gates of each of the triacs 11a through 11e are connected to the output of a respectively associated synchronously operable control circuit 90a through 90e, respectively. Each of the control circuits 90a through 90e is identical in construction and operation to the synchronously operable control circuit shown in FIGURE 6 of the drawings and hence are shown only in block diagram form.

From a consideration of FIGURE 10, it can be determined that the first four heating elements 12a through 12d are designed for watts control, and that therefore the synchronously operable control circuits of these elements are operatively coupled to the output of a relaxation oscillator shown generally at 91. The relaxation oscillator 91 is a unijunction transistor oscillator and is energized from a low voltage direct current potential source which includes the filter capacitor 18. The low voltage direct current potential appearing across capacitor 18 is derived from all of the individual diode rectifiers 65 (shown in FIGURE 6) whose outputs are connected back to the filter capacitor 18 through the terminals 3 of each of the synchronously operable control circuits 90a and 90e, and through the low voltage direct current terminal or bus 53. Thus, redundancy is provided in the power supply which greatly improves the reliability of the circuit in that if any one of the rectifiers fails, others are available to take over. A stabilized, reduced value direct current potential is derived for operation of relaxation oscillator 91 by a voltage dividing network comprised by a resistor 92 and Zener diode 93 connected in series circuit relationship across the filter capacitor 18. The stabilization provided by Zener diode 93 reduces possibility of interaction between controls of the various elements, and further reduces the effect of fluctuations in the supply voltage.

The relaxation oscillator 91 is comprised by a complementary unijunction transistor 94 (also referred to as a reverse base unijunction transistor). The complementary unijunction transistor 94 has one of its base electrodes connected to terminal 13 directly and its remaining base electrode connected to the junction of the voltage divider comprised by the series connected resistor 92 and Zener diode 93. The emitter of the complementary unijunction transistor 94 is connected to the junction of a resistance-capacitance charging network comprised by a capacitor 83 and a resistor 84 connected in series circuit relationship across the Zener diode 93. In operation, it should be noted that the complementary unijunction transistor 94 functions in a manner similar to the conventional unijunction transistor with the exception that it operates off of a negative polarity potential normally required for the conventional unijunction transistor. Hence, the device is given the name "complementary" or "reverse base" unijunction transistor. While complementary unijunction transistors are not generally available at this time on an off-the-shelf commercial basis, these devices can be obtained on a special job order basis from the Semiconductor Products Department of the General Electric Company located at Electronics Park in Syracuse, N.Y.

In operation, the unijunction transistor oscillator 91 serves to develop a negative going saw-tooth waveform reference potential that is applied to the base of a PNP junction transistor 95. Transistor 95 serves to amplify the unijunction saw tooth wave to provide sufficient drive for several control circuits and to reduce possibility of interactions between controls. The transistor 95 has its emitter connected to a load resistor 96 and operates as an emitter follower amplifier. The negative going saw-tooth waveform reference potential developed across the load resistor 96 is coupled through a first reference potential terminal or bus 97 to the terminals 2 of each of the synchronously operable control circuits 90a through 90d. In addition to the negative going saw tooth waveform reference potential, the reduced voltage direct current potential appearing across the Zener diode 93 is coupled through a reduced voltage direct current potential terminal or bus 98 where it is applied across individual ones of the variable resistors 81a through 81d associated with each of the synchronously operable control circuits 90a through 90d. The variable contact points of each of the variable resistors 81a through 81d are connected through the terminals 1 of each of their respective associated synchronously operable control circuits. By referring to FIGURE 6 of the drawings, it can be appreciated that the effect of these connections is to apply the negative going saw-tooth waveform reference potential to the base of the control transistor 61 of each of the synchronously operable control circuits, and to apply an operator adjustable variable magnitude direct current low voltage reference potential from each of the variable resistors 81a through 81d to the emitters of each of the control transistors 61. By this arrangement, the operation of the control transistor 61 can be effectively controlled in a similar fashion to that described with relation to FIGURES 9a and 9b with the one difference being that a negative polarity control signal is derived in place of the positive polarity control signal described with relation to FIGURES 9a and 9b. The operation also differs further in that turn on of the the control transistor 61 in the synchronously operable control results in zero level load current through the load. In this manner, watts control over the operation of each of the burner elements 12a through 12d is obtained.

It will be noted that adjustable watts control is not provided for the fifth heating element 12e shown in FIGURE 10. This heating element is intended to depict the heating element of the oven of an electric range and therefore it is desirable that this element be provided with a temperature sensitive control. For this purpose, an adjustable temperature-sensitive circuit is operatively coupled to the synchronously operable control circuit 90e which controls the control gate of triac 11e that in turn controls heating current flow through the heating element 12e. The adjustable temperature-sensitive control is provided by an operator adjustable variable resistor 19 connected in series circuit relationship with the thermistor 21 across the low voltage direct current potential terminal 53. The thermistor 21 is physically positioned so that it is thermally coupled to the heating element 12e and measures the temperature of the oven which is heated by that element. The junction of the thermistor 21 and variable resistor 19 is connected to terminal 2 of the synchronously operable control circuit 90e. It should also be noted that terminal 1 and terminal 4 of the synchronously operable control circuit are interconnected through the conductor 99. By referring to FIGURE 5 of the drawings, it will be seen that the resulting circuit connections of the oven synchronously operable control 90e are identical to the circuit shown in FIGURE 5 and function in precisely the same manner to effect temperature control of the operation of the oven heating element 12e.

From a consideration of FIGURE 10, it can be appreciated that the range control of FIGURE 10 affords several distinct operational advantages of importance. One of these advantages is in the connection of the voltage dividing resistors 22a through 22e to the neutral wire 89. This provides considerably reduced power dissipation in these resistors (by a factor of about 4 to 1) from what would be involved if they were connected to the power conductor 14. The provision of neon or other flash lamps 100a through 100d for each of the range top heater elements provides the housewife or other range operator with a readily viewed visible indication of the heating rate of the heating element. At lower heating rates, the flash lamps flash at a low repetition rate of frequency. At higher heating rates, the frequency of flashing increases. For this purpose the neon lights 100a through 100d are connected in series with small dropping resistors 100' across each of their associated heating elements 12a–12d. In addition to these features, the readily separable low voltage control units are amenable to being remotely located from the heating elements they control. Hence in custom installed range tops and ovens, the controls can be remotely located at a central control station. Further, the provision of all static electrical non-mechanical controls eliminates the need for mechanically moving switches and parts that are susceptible to burring, chattering and other wear and tear, and cause considerable undesired RFI and lamp flicker effects.

FIGURE 11 of the drawings illustrates a universal watts-temperature control for use in controlling portable appliances. The circuit of FIGURE 11 is comprised by a standard 110 volts convenience outlet 101 connected in series circuit relationship with a triac 11 across the power supply terminals 13 and 14. To indicate when the convenience outlet 101 is energized, a small pilot lamp 102 is connected in parallel with it. The control gate of the triac 11 is connected to the output of a synchronously operable control circuit indicated generally by the dotted outline box 90 for controlling the operation of the triac 11. The synchronously operable control circuit 90 is similar in construction and operation to the control circuit shown in FIGURE 6 of the drawings, and hence, will not again be described in detail.

The synchronously operable control circuit 90 shown in FIGURE 11 is similar almost in all respects to the circuit of FIGURE 6 with the exception that it is adapted for use with both a temperature control or a variable watts control. The temperature control is indicated by a thermistor 20. Alternatively, 20 can be considered to be a receptacle for receiving a plug thermistor unit adapted to be remotely located from the control unit. Through proper actuation of a selector switch shown at 103, the synchronously operable control 90 may be provided with a variable watts control when used in conjunction with the output from a relation oscillator shown generally in the dotted outline box 91.

In operation, with the movable contacts of the double pole-double throw selector switch 103 closed on its fixed contacts marked W for watts control, the saw-tooth waveform reference potential developed at the emitter of the unijunction transistor 82 will be applied through the conductor 104 to the base of control transistor 61. An operator adjustable variable magnitude direct current reference potential developed across the variable resistor 19 will also be applied through limiting resistor 37 to the emitter of control transistor 61. With the circuit thus connected, control transistor 61 will be controlled in a manner similar to that described with relation to FIGURES 9a and 9b of the drawings (with the exception of the inverted mode of operation) to provide variable watts control of a portable appliance plugged into the 110-volt convenience outlet 101.

If instead of variable watts control, it is desired to provide temperature control of the portable appliance plugged into the convenience outlet 101, the selector switch 103 is closed on its fixed contacts marked T. With the selector switch 103 thus actuated, a fixed DC bias potential will be applied through the dropping resistor 105 and conductor 104 to the base of control transistor 61. In addition to this reference potential, a temperature responsive control signal will be supplied from the thermistor 20 and operator adjusted variable resistor 19 to the emitter of the control transistor 61. With the circuit thus arranged, it can be appreciated that the synchronously operable control circuit 90 will function in a similar manner to the circuit described with relation to FIGURE 5 to thereby provide temperature control over the operation of the portable appliance plugged in the convenience outlet 101.

FIGURE 12 of the drawings illustrate a zero crossing synchronous switching alternating current power circuit which in many respects is similar to the circuit shown in FIGURE 5 in that it is intended primarily for use as a temperature control power circuit for the heating element 12. The circuit of FIGURE 12, however, differs from the circuit of FIGURE 5 in that it provides two additional functions. These two additional functions shall be identified as an anticipation function and a boil control function. The anticipation function is made possible by the addition of a lead network comprised by a parallel connected capacitor 111 and resistor 112 which are connected between the base of the control transistor 61 and the output of the adjustable temperature sensitive network comprised by the series connected variable resistor 19 and thermistor 20. This lead network introduces a time lead into the signal applied to the base of the control transistor 61 so that in effect the control transistor 61 will anticipate by a finite lead time the temperature cut-off requirements of the thermistor 20 to produce minimum temperature overheat of the load. The need for this anticipation is dictated by the time lag involved in the response of thermistor 20 to changes in temperature of the heating element 12 since it is coupled to the load temperature through the medium of a pan bottom, as an example, and therefore is subject to several different forms of thermal impedances. For a description of a suitable temperature sensor for this purpose, see for example U.S. Patent No. 2,813,962, issued Nov. 19, 1957 entitled "Surface Cooking Unit Control Apparatus," inventor—George F. Skala—assigned to the General Electric Company. By appropriate adjustment of the values of this lead network, the temperature controlling signal applied to the base of the control transistor 61 can be made to provide optimum dynamic performance under transient conditions determined essentially by the adjustment of variable resistor 19.

The boil control function made possible with the circuit of FIGURE 12 is required for protective and economic reasons where the heating element 12 of an electric range or the like is being employed to heat water or a similar substance is susceptible to being boiled away if not properly controlled. The boil control feature of the circuit of FIGURE 12 is provided to protect against this exigency as well as to provide a finer control over the boiling operation. This is complicated by the fact that this function is at constant temperature.

The boil control function is provided by an additional override control pnp junction transistor 105. The override control transistor 105 has its collector connected through a limiting resistor 106 back to the emitter of the first control transistor 61. The emitter of the override control transistor 105 is connected through a limiting resistor 107 to the terminal 55 of the low voltage direct current power supply. The emitter of override control transistor 105 is also connected through a variable resistor 108 to the junction 4 of the two voltage dividing Zener diodes 62 and 63. By means of the adjustable resistor 108 which can be adjusted by an operator, a variable magnitude steady state low voltage direct current reference potential is applied to the emitter of the override control transistor 105. The base of the additional override control transistor 105 is connected to the output of a unijunction transistor oscillator shown generally at 91 for supplying negative going saw-tooth waveform reference potential to the base of the override control transistor 105. The unijunction transistor oscillator 91 is comprised by a complementary unijunction transistor 94, a resistor 84, and capacitor 83, and operates in a fashion identical to the unijunction transistor oscillator 91 described with relation to FIGURE 10 of the drawings. The negative going saw-tooth waveform potential developed by unijunction transistor oscillator 91 is coupled through an emitter-follower coupling stage comprised by a pnp junction transistor 95 and load resistor 96 to the base of the override control transistor 105. In addition to the above recited elements, the circuit of FIGURE 12 also includes a blocking diode 109 coupled across the emitter-base of the first control transistor 61 to provide a discharge path for charge that may accumulate on lead capacitor 111. A resistor could also serve the function of diode 109.

The operation of the override control transistor 105 can best be understood in connection with the voltage waveshapes shown in FIGURES 15 and 16 of the drawings. Referring to FIGURES 15 and 16, the negative going saw-tooth waveform potential applied to the base of the override control transistor 105 is shown as $V_R$. This saw-tooth waveform potential (which has a period substantially greater than the period of the 60 cycle supply potential) at some point depending upon the setting of the variable resistor 108, will go negative with respect to the potential $V_{bo}$. The potential $V_{bo}$ represents the potential at the emitter of the override control transistor 105 as determined by the setting of variable resistor 108. Upon $V_R$ going negative with respect to $V_{bo}$, the override control transistor 105 will turn on for a time interval depicted by the pulsed wave form signals illustrated in FIGURES 15b and 15c. Referring now to FIGURE 16a, the condition is shown where the adjustable resistor 108 is set to drive the potential of the emitter $V_{bo}$ somewhat more positive so that the saw-tooth waveform reference potential $V_R$ intercepts it at an earlier point in its period. The result of this setting is that the override control transistor 105 is turned on for a greater length of time as illustrated in FIGURES 16b and 16c. It can be appreciated therefore that if the potential $V_{bo}$ is raised to the point where it is equal to zero volts, that the override control transistor would be on continuously corresponding to a condition of high boil. In its medium position, as illustrated by FIGURE 16a, this would represent a medium boil, and at some highly negative position, as illustrated by FIGURE 15a, this would represent a low boil condition. If it is desired to render the override control ineffective, then resistor 108 is adjusted so that the saw-tooth waveform potential never goes negative with respect to the potential $V_{bo}$, and the control circuit would then operate identically to the control of FIGURE 5.

There is an additional control feature possible with the circuit of FIGURE 12 which provides the circuit with protection against an over-boil condition. It is a characteristic of boiling water for example that the temperature of the pan in which the boiling water is located will remain essentially constant at 212° F. for as long as there is boiling water in the pan. Upon the water being boiled away, the temperature of the pan will then rise rapidly possibly resulting in damage to the pan and/or heating element. The circuit of FIGURE 12 senses this condition by sensing the rise in temperature of the pan. The manner in which the circuit accomplishes this can best be understood again in connection with FIGURES 15 and 16 of the drawings.

Again referring to FIGURE 12 of the drawings, it should be noted that upon the override control transistor 105 being turned on, the emitter of the NPN junction control transistor 61 will be driven positive due to its interconnection to terminal 55 through resistors 106, 107 and the override control transistor. By proper adjustment of the values of the resistors 106 and 107, and 37, the magnitude or the extent to which the emitter of control transistor 61 is driven positive can be controlled with relation to the potential at the base of the transistor as determined by the temperature of thermistor 20. It should be noted that the temperature of thermistor 20 will determine the value of the bias potential applied to the base of the transistor 61. This potential is illustrated in FIGURE 15b as potential as $$V_b = V_{200°} = \frac{-V}{2}$$

where $V/2$ is the value of the low voltage direct current potential appearing at the junction of Zener diodes 62 and 63. This potential then would correspond approximately to the potential appearing at the base of transistor 16 when the thermistor 20 is experiencing a temperature of 200° F. With the circuit operating under these conditions, the emitter control transistor 61 will be driven positively by a maximum override potential $V_{OR}$ which represents the difference between the potentials across thermistor 20 at 200° F. and 260° F. Thus, the override potential $V_{OR}$ is illustrated by the cross hatched voltage spikes in FIGURES 15b and 16b. If the temperature of thermistor 20 rises to a value of 240° F. as shown in FIGURES 15c and 16c, it can be seen that the override potential $V_{OR}$ is then reduced by a factor of about one half to a value represented by the difference of the potential across thermistor 20 at 260° F. and 240° F. It can be appreciated, therefore, that as the temperature of a pan in which water has boiled away rises, and hence the temperature of the thermistor 20 rises, the override potential $V_{OR}$ reduces to the point where at a temperature of 260°, there is no override potential, and the thermistor 20 will take over and control further operation of the main control transistor 61. The take over point, 260° F., is here used as an example, and generally depends on the quality of the pan bottom detector design and the Calrod or heater design. Further, while one form of take over control is disclosed which takes over control at a lower temperature and releases control at a higher temperature, it is believed obvious to one skilled in the art that the reverse process could be worked out with equal facility.

FIGURE 13 of the drawings illustrates a version of a synchronously operable control circuit which is similar to the circuit of FIGURE 7 in that it employs primarily npn junction transistors. The circuit of FIGURE 13, however, is designed to provide the additional functions of time anticipation and boil control similar to the control circuit employed in the FIGURE 12 arrangement. For this purpose, the circuit of FIGURE 13 includes the additional override control transistor 115, resistor 112, discharge diode 116, resistors 106 and 107 and an additional resistor 117. The provision of the additional resistor 117 allows the control circuit of FIGURE 13 to be used in an arrangement as illustrated in dotted outline form in FIGURE 12. It should be noted that all of the elements shown in the circuit of FIGURE 13 are capable of being fabricated in integrated circuit form as was true of the FIGURE 7 circuit, the only difference between the two circuits being that the FIGURE 13 circuit provides the additional boil control and anticipation functions. In a similar fashion, the synchronously operable control circuit employed in the arrangement of FIGURE 12 could be fabricated in modular integrated circuit form by breaking away that portion of the control circuit interconnected to the power circuit components through the terminals marked 1–10. It should also be noted that if the circuit shown in FIGURE 12 were provided with the additional resistor 117, shown in dotted outline form, the variable control resistor 108 could be connected in a manner illustrated in dotted outline form and thereby obviate the need for the additional terminal 9 required bw the circuit as arranged in solid line form, FIGURE 14 of the drawings illustrates still a different form of electric range control circuit suitable for use with electric ranges. The control circuit shown in FIGURE 14 is similar in almost every respect to the range circuit shown in FIGURE 10 with the exception that the first two burner elements 12a and 12b are provided with the synchronously operable control circuit shown in FIGURE 12. For this reason, the burner elements 12a and 12b will be provided with the additional boil control and anticipation functions made possible with the synchronously operable control circuit of FIGURE 12. Since these control circuits were described fully in connection with FIGURE 12 and would operate in an identical fashion when used in the circuit arrangement of FIGURE 14 to control each of their associated burner elements 12a or 12b, a further description of the circuits is believed unnecessary. In all other respects, the circuit in FIGURE 14 will operate in the same manner as the circuit of FIGURE 10, and a further description thereof is believed unnecessary.

From the foregoing description, it can be appreciated that the present invention provides new and improved zero crossing, synchronously switched power circuits which employ power semiconductor gate controlled bidirectional conducting devices. These circuits are controlled with new and improved low voltage synchronously operable control circuits which operate at low voltage and low current values and therefore have low dissipation losses. The control circuits consequently are capable of being fabricated in modular integrated circuit form so that they can be embodied in simple single units of small size and low cost, and have improved reliability and serviceability made possible by their modular or integrated structure.

Having described several embodiments of new and improved zero crossing synchronous switching power circuits and synchronously operable control circuits therefor which are constructed in accordance with the invention, it is believed obvious that other modifications and variations of the invention are possible in the light of the above teachings. It is therefore to be understood that changes may be made in the particular embodiments of the invention described which are within the full and intended scope of the invention as defined by the appended claims.

What we claim as new and desire to secure by Letters Patent of the United States is:

1. A power control circuit including in combination at least one semiconductor load current carrying gate bidirectional controlled conducting device and a load connected in series circuit relationship across a pair of power supply terminals, and synchronously operable control circuit means coupled to and controlling the gate controlled conducting device comprising means for providing a continuous low voltage signal level gating potential, gating means operatively coupled to the means for providing the gating potential and operatively coupled to the control gate of said bidirectional conducting device for applying a gating-on signal to the device to cause the same to conduct load current therethrough, shunt means operatively coupled to the gating means for shunting the gating means, control means operatively coupled to said shunt means for controlling operation of said shunt means, and means operatively coupled to said control means for applying a control signal to said control means to control operation of the control means through the zero value region of the supply potential.

2. A power control circuit including in combination at least one semiconductor load current carrying bidirectional gate controlled conducting device and a load connected in series circuit relationship across a pair of power supply terminals that in turn are adapted to be connected across a source of alternating current potential, and synchronously operable control circuit means coupled to and controlling the gate controlled bidirectional conducting device comprising means for providing a continuous low voltage signal level gating potential, gating means operatively coupled to the means for providing the gating potential and operatively coupled to the control gate of said bidirectional conducting device for applying a gating-on signal to the device to cause the same to conduct load current therethrough in a direction depending upon the polarity of the potential across its load terminals, first shunt means operatively coupled to the gating means for shunting the gating means with one polarity of a supply alternating current potential, second shunt means operatively coupled to the gating means for shunting the gating means with the opposite polarity of the supply alternating current potential, control means operatively coupled to at least one of said shunt means for controlling operation of said at least one shunt means, and means operatively coupled to said control means for applying a control signal to said control means to control operation of the control means through the zero value region of the supply alternating current potential.

3. A synchronously operable control circuit for a power circuit comprising means for providing a continuous low voltage signal level gating potential, gating means operatively coupled to the means for providing the low voltage gating potential and adapted to be operatively coupled to the control gate of at least one power semiconductor load current carrying gate controlled conducting device for continuously applying a gating-on signal to the device to cause the same to conduct load current therethrough, shunt means operatively coupled to the gating means for shunting the gating means, control means operatively coupled to said shunt means for controlling operation of said shunt means, and means operatively coupled to said control means for applying a control signal to said control means to control operation of the control means through the zero value region of the supply potential.

4. A synchronously operable control circuit for a power circuit comprising a means for providing a continuous low voltage signal level gating potential, gating means operatively coupled to the means for providing the low voltage gating potential and adapted to be operatively coupled to the control gate of at least one power semiconductor load current carrying bidirectional gate controlled conducting device for continuously applying a gating-on signal to the device to cause the same to conduct load current therethrough in a direction dependent upon the polarity of a supply potential applied across its load terminals, first shunt means operatively coupled to the gating means for shunting the gating means during one polarity of a supply alternating current potential, second shunt means operatively coupled to the gating means for shunting the gating means during the opposite polarity of the supply alternating current potential, control means operatively coupled to at least one of said shunt means for controlling operation of said at least one shunt means, and means operatively coupled to said control means for applying a control signal to said control means to control operation of the control means through the zero value region of the supply alternating current potential.

5. An alternating current power control circuit including in combination at least one power semiconductor load current carrying bidirectional gate controlled conducting device for controlling current flow through a load, a rectifying network adapted to be connected across a supply alternating current potential source in parallel circuit relationship with the bidirectional gate controlled conducting device, synchronously operable control circuit means operatively coupled to said bidirectional gate controlled conducting device for controlling the same and comprising a gating transistor operatively coupled to the control gate of the bidirectional conducting device, circuit means connecting the output of the rectifying network to the gating transistor for continuously applying a gating-on signal to the gating transistor to cause the same to gate on the bidirectional conducting device and supply load current through a load connected to the device, a diode bridge and shunt transistor operatively coupled across the alternating current supply terminals and to the gating transistor for shunting the gating transistor during each polarity of a supply alternating current potential applied to the supply terminals, a control transistor operatively coupled to said diode bridge and shunt transistor for controlling the operation thereof, and control signal applying means operatively coupled to said control transistor for applying a control signal to said control transistor to control the operation thereof through the zero value region of a supply alternating current potential applied to the supply terminals.

6. A synchronously operable control circuit for an alternating current power circuit comprising a gating transistor adapted to have an output terminal operatively coupled to the control gate of at least one bidirectional gate controlled conducting device for gating on the device, circuit means operatively coupled to said gating transistor for continuously applying a turn-on signal to said gating transistor, a diode bridge and shunt transistor operatively coupled to said gating transistor for shunting the base-emitter of the gating transistor for each polarity of a supply alternating current potential for the bidirectional gate controlled conducting device to which the synchronously operable control circuit is adapted to be connected, a control transistor operatively coupled to said diode bridge and shunt transistor for controlling the operation thereof during at least one polarity of the supply alternating current potential, and control signal applying means operatively coupled to the control transistor for controlling the operation of the control transistor at least during the interval when the supply alternating current potential passes through the zero value region.

7. An alternating current power control circuit including in combination at least one power semiconductor load current carrying bidirectional gate controlled conducting device adapted to be connected in series with a load across a pair of alternating current power supply terminals, and synchronously operable control circuit means coupled to said bidirectional conducting device, the synchronously operable control circuit means comprising a gating transistor having an output terminal operatively coupled to the control gate of the bidirectional gate controlled conducting device for gating on the device, rectifying means adapted to be connected across the alternating current power supply terminals in parallel with a bidirectional conducting device and load for deriving a relatively low value direct current control potential, circuit means operatively coupled between the output of said rectifying means and said gating transistor for continuously applying a turn-on signal to the gating transistor, a first shunt transistor operatively coupled to said gating transistor for shunting the base-emitter of the gating transistor for one polarity of a supply alternating current potential applied across the power supply terminals, a second shunt transistor operatively coupled to said gating transistor for shunting the base-emitter of the gating transistor for the opposite polarity of the supply alternating current potential, a control transistor operatively coupled to at least one of said shunt transistors for controlling the operation of said at least one shunt transistor, voltage dividing means operatively coupled across said rectifying means and having said control transistor operatively coupled thereto for applying a reference potential to said control transistor, and control signal applying means operatively coupled to said control transistor for applying a control signal thereto to control the operation of the control transistor at least during the interval that the supply alternating current potential passes through the zero value region.

8. A synchronously operable control circuit for an alternating current power circuit comprising a gating transistor adapted to have an output terminal operatively coupled to the control gate of at least one bidirectional gate controlled conducting device for gating on the device, means coupled to said gating transistor for continuously applying a turn-on signal to said gating transistor, a first shunt transistor operatively coupled to said gating transistor for shunting the base-emitter of the gating transistor for one polarity of a supply alternating current potential for the bidirectional gate controlled conducting device to which the synchronously operable control circuit is adapted to be connected, a second shunt transistor operatively coupled to said gating transistor for shunting the base-emitter of the gating transistor for the opposite polarity of the supply alternating current potential, a control transistor operatively coupled to at least one of said shunt transistors for controlling the operation of said at least one shunt transistor, and control signal applying means operatively coupled to said control transistor for applying a control signal to said control transistor to thereby control its operation at least during the interval that the supply alternating current potential passes through the zero value region.

9. A synchronously operable control circuit for an alternating current power circuit comprising a PNP junction gating transistor having its emitter adapted to be connected to the control gate of at least one bidirectional gate controlled conducting device for gating on the device, said gating transistor having its collector connected to a terminal for continuously supplying a low voltage direct current turn-on control potential, a limiting resistor connected in the emitter-collector circuit of the gating transistor, a limiting resistor connecting the base of the gating transistor to the low voltage, direct current turn-on control potential terminal, a first shunt PNP junction transistor having its collector connected to the base of the gating transistor and having its base connected to the opposite low voltage direct current control potential terminal from that to which the base of the gating transistor is connected, a first voltage dividing network adapted to be connected across a source of supply alternating current potential, the emitter of the first shunt transistor being connected to the first voltage dividing network, a second shunt PNP junction transistor having its collector connected to the base of the gating transistor and having its emitter connected to the same low voltage direct current control potential terminal to which the base of the first shunt transistor is connected, the base of the second shunt transistor being connected through a blocking diode to the first voltage dividing network, a control NPN junction transistor having its collector connected to the base of the second shunt transistor at a point intermediate the base and the blocking diode, and control signal applying means operatively coupled to the emitter-base of the control transistor for applying a control signal to the control transistor to control its operation at least during the interval that the supply alternating current poential passes through the zero value region.

10. The combination set forth in claim 9 further characterized by a rectifying diode operatively coupled between the first voltage dividing network and the low voltage direct current turn-on control potential terminal for deriving that potential.

11. The combination set forth in claim 9 further characterized by a second voltage dividing network connected across the low voltage direct current turn-on control potential terminals for deriving a reference potential.

12. The combination set forth in claim 9 further characterized by a rectifying diode operatively coupled between the first voltage dividing network and the low voltage direct current turn-on control potential terminal for deriving that potential, a second voltage dividing network connected across the low voltage direct current turn-on control potential terminals for deriving a reference voltage, and a shunt diode connected in parallel circuit relationship with one of the elements of the first voltage dividing network for increasing the base-emitter current of one of the shunt transistors.

13. The synchronously operable control circuit for an alternating current power circuit comprising a NPN junction gating transistor having its emitter adapted to be connected to the control gate of at least one bidirectional gate controlled conducting device for gating on the device, said gating transistor having its collector connected to a terminal for continuously supplying a low voltage direct current turn-on control potential, a limiting resistor connected in the emitter-collector circuit of the gating transistor, a limiting resistor connecting the base of the gating transistor to the low voltage, direct current turn-on control potential terminal, a first shunt NPN junction transistor having its collector connected to the base of the gating transistor and having its base connected to the opposite low voltage direct current control potential terminal from that to which the base of the gating transistor is connected, a first voltage dividing network adapted to be connected across a source of supply alternating current potential, the emitter of the first shunt transistor being connected to the first voltage dividing network, a second shunt NPN junction transistor having its collector connected to the base of the gating transistor and having its emitter connected to the same low voltage direct current control potential terminal to which the base of the first shunt transistor is connected, the base of the second shunt transistor being connected through a blocking diode to the first voltage dividing network, a control PNP junction transistor having its collector connected to the base of the second shunt transistor at a point intermediate the base and the blocking diode, and control signal applying means operatively coupled to the emitter-base of the control transistor for applying a control signal to the control transistor to control its operation at least during the interval that the supply alternating current potential passes through a zero value region.

14. The combination set forth in claim 13 further characterized by a rectifying diode operatively coupled between the first voltage dividing network and the low voltage direct current turn-on control potential terminal for deriving that potential.

15. The combination set forth in claim 13 further characterized by a second voltage dividing network connected across the low voltage direct curent turn-on control potential terminals for deriving a reference potential.

16. The combination set forth in claim 13 further characterized by a rectifying diode operatively coupled between the first voltage dividing network and the low voltage direct current turn-on control potential terminal for deriving that potential, a second voltage dividing network connected across the low voltage direct current turn-on control potential terminals for deriving a reference voltage, and a shunt diode connected in parallel circuit relationship with one of the elements of the first voltage dividing network for increasing the base-emitter current of one of the shunt transistors.

17. A synchronously operable control circuit for an alternating current power circuit comprising a NPN junction gating transistor having its emitter adapted to be connected to the control gate of at least one bidirectional gate controlled conducting device for gating-on the device, said gating transistor having its collector connected to a terminal for continuously supplying a low voltage direct current turn-on control potential, a limiting resistor connected in the emitter-collector circuit of the gating transistor, a limiting resistor connecting the base of the gating transistor to the low voltage, direct current turn-on control potential terminal, a first shunt NPN junction transistor having its collector connected to the base of the gating transistor and having its base connected to the opposite low voltage direct current control potential terminal from that to which the base of the gating transistor is connected, a first voltage dividing network adapted to be connected across a source of supply alternating current potential, the emitter of the first shunt transistor being connected to the first voltage dividing network, a second shunt NPN junction transistor having its collector connected to the base of the gating transistor and having its emitter electrode connected to the same low voltage direct current control potential terminal to which the base of the first shunt transistor is connected, the base of the second shunt transistor being connected through a blocking diode to the first voltage dividing network, a control NPN junction transistor having its collector connected through a Zener diode to the base of the second shunt transistor at a point intermediate the base and the blocking diode, a voltage dividing resistor connected between the collector of the control transistor and the low voltage direct current potential terminal to which the collector of the gating transistor is connected, and control signal applying means operatively coupled to the emitter base of the control transistor for applying a control signal to the control transistor to control its operation at least during the interval that the supply alternating current potential passes through the zero value region.

18. The combination set forth in claim 17 further characterized by a rectifying diode operatively coupled between the first voltage dividing network and the low voltage direct current turn-on control potential terminal for deriving that potential.

19. An alternating curent power control circuit including in combination at least one power semiconductor load current carrying bidirectional gate controlled conducting device adapted to be connected in series circuit relationship with a load across a pair of alternating current power supply terminals, and synchronously operable control circuit means operatively coupled to the gate controlled bidirectional conducting device, the synchronously operable control circuit means comprising a gating transistor adapted to have an output terminal operatively coupled to the control gate of the bidirectional gate controlled conducting device for gating on the device, means coupled to the gating transistor for continuously applying a turn-on signal to the gating transistor, a first shunt transistor operatively coupled to the gating transistor for shunting the base-emitter of the gating transistor for one polarity of the supply alternating current potential, a second shunt transistor operatively coupled to the gating transistor for shunting the base-emitter of the gating transistor for the opposite polarity of the supply alternating current potential, a control transistor operatively coupled to at least one of the shunt transistors for controlling the operation of the said at least one shunt transistor, a unijunction transistor oscillator, and a potentiometer, the control transistor having its emitter-base operatively coupled between the variable tap-off point of the potentiometer and the output of the unijunction transistor oscillator whereby the control transistor will control the operation of the said at least one shunt transistor during the interval that the supply alternating current potential passes through the zero value region to thereby control gating on and off of the bidirectional gate controlled conducting device synchronously with the suply alternating current potential.

20. An alternating current power control circuit including in combination a plurality of heating elements connected in parallel circuit relationship across a pair of power supply terminals that in turn are adapted to be connected across a source of alternating current potential, at least one power semiconductor load current carrying bidirectional gate controlled conducting device connected in series circuit relationship with each one of said heating elements for controlling load current flow therethrough, a synchronously operable control circuit for each of said bidirectional gate controlled conducting devices, each of said synchronously operable control circuits comprising gating means operatively coupled to the control gate of an associated gate controlled bidirectional conducting device for gating on the device, means for continuously applying a low voltage direct current turn-on control signal to said gating means, first shunt means operatively coupled to the gating means for shunting the turn-on control signal with one polarity of a supply alternating current potential, second shunt means operatively coupled to the gating means for shunting the turn-on control signal with the opposite polarity of the supply alternating current potential, and control means operatively coupled to at least one of the shunt means for controlling the operation of at least one shunt means through the zero value region of the supply alternating current potential, rectifying means operatively coupled to the synchronously operable control circuit for deriving the low voltage direct current turn-on control signal, a unijunction transistor oscillator energized from said rectifying means for developing a substantially sawtooth waveform reference potential, means for applying the sawtooth waveform reference potential to the control means of at least one of said synchronously operable control circuits, means energized by said rectifying means for deriving an operator control variable magnitude reference potential for application to the control means of the said at least one synchronously operable control circuit in conjunction with the sawtooth waveform reference potential to thereby control operation of the control means and hence control turn-on of the associated load current carrying bidirectional conducting device and its heating element, and adjustable temperature sensitive means thermally coupled to at least one of the heating elements, said adjustable temperature sensing means being energized by said rectifying means and being operatively coupled to the control means of the synchronously operable control circuit for the heating element to which the temperature sensitive means is thermally coupled for controlling operation of the said last-mentioned control means and thereby control heating current flow to the heating element.

21. The combination set forth in claim 20 wherein the synchronously operable control circuit for each of the bidirectional gate controlled conducting devices comprises a gating transistor adapted to have an output terminal operatively coupled to the control gate of its associated bidirectional gate controlled conducting device for gating on the device, means coupled to the gating transistor for continuously applying a turn-on signal to the gating transistor, a first shunt transistor operatively coupled to the gating transistor for shunting the base-emitter of the gating transistor for one polarity of a supply alternating current potential, a second shunt transistor operatively coupled to the gating transistor for shunting the base-emitter of the gating transistor for the opposite polarity of the supply alternating current potential, a control transistor operatively coupled to at least one of the shunt transistors for controlling the operation of the at least one shunt transistor, and control signal applying means operatively coupled to the control transistor to which the control reference potentials are applied for controlling the operation of the control transistor at least during the interval that the supply alternating current potential passes through the zero value region.

22. The combination set forth in claim 20 wherein the synchronously operable control circuit for each of the bidirectional gate controlled conducting devices comprises a PNP junction gating transistor having its emitter connected to the control gate of its associated bidirectional gate controlled conducting device for gating on the device, said gating transistor having its collector connected to a terminal for continuously supplying a low voltage direct current turn-on control potential, and a limiting resistor connected in the emitter-collector circuit of the gating transistor, a limiting resistor connecting the base of the gating transistor to the low voltage direct current turn-on control potential terminal, a first shunt PNP junction transistor having its collector connected to the base of the gating transistor and having its base connected to the opposite low voltage direct current control potential terminal from that to which the base of the gating transistor is connected, a first voltage dividing network adapted to be connected across a source of supply alternating current potential, the emitter of the first shunt transistor being connected to the first voltage dividing network, a second shunt PNP junction transistor having its collector connected to the base of the gating transistor and having its emitter connected to the same low voltage direct current control potential terminal to which the base of the first shunt transistor is connected, the base of the second shunt transistor being connected through a blocking diode to the first voltage dividing network, a control NPN junction transistor having its collector connected to the base of the second shunt transistor at a point intermediate the base and the blocking diode, and control signal applying means operatively coupled to the emitter-base of the control transistor for applying control reference potentials to the control transistor to control its operation at least during the interval that the supply alternating current potential passes through the zero value region.

23. The claims set forth in claim 22 wherein the gating transistor is a NPN junction transistor, the first shunt transistor is a NPN junction transistor, the second shunt transistor is a NPN junction transistor, and the control transistor is a PNP junction transistor.

24. The combination set forth in claim 22 wherein the gating transistor is a NPN junction transistor, the first shunt transistor is a NPN junction transistor, the second shunt transistor is a NPN junction transistor, and the control transistor is a NPN junction transistor having its collector connected through a Zener diode to the base of the second shunt transistor at a point intermediate to the base and the blocking diode, and is further characterized by a voltage dividing resistor connected between the collector of the control transistor and the low voltage direct current turn-on signal potential terminal to which the collector of the gating transistor is collected.

25. A universal watts-temperature control for portable appliances including in combination a convenience outlet and at least one semiconductor load current carrying bidirectional gate controlled conducting device connected in series circuit relationship across a pair of power supply terminals that in turn are adapted to be connected across a source of alternating current potential, synchronously operable control circuit means for controlling the bidirectional conducting device comprising gating means operatively coupled to the control gate of the gate controlled bidirectional conducting device for gating on the device, means for continuously applying a low voltage direct current turn-on control signal to said gating means, first shunt means operatively coupled to the gating means for shunting the turn-on control signal with one polarity of a supply alternating current potential, second shunt means operatively coupled to the gating means for shunting the turn-on control signal with the opposite polarity of the supply alternating current potential and control means operatively coupled to at least one of the shunt means for controlling the operation of the at least one shunt means through the zero value region of the supply alternating current potential, rectifying means operatively coupled to the synchronously operable control circuit for deriving the low voltage direct current turn-on control signal, a unijunction transistor oscillator energized from said rectifying means for developing a substantially sawtooth waveform reference potential, means energized by said rectifying means for deriving an operator controlled variable magnitude reference potential, and adjustable temperature sensitive means adapted to be thermally coupled to the portable appliance plugged into the convenience outlet, said adjustable temperature sensitive means being energized by said rectifying means for deriving a temperature control signal, and switching means operatively coupled to said temperature sensitive means, said unijunction transistor oscillator, and said means for deriving the operator control variable magnitude reference potential as well as to the control means of the synchronously operable control circuit for selectively applying the sawtooth waveform reference potential in conjunction with the operator control variable magnitude reference potential to the control means of the synchronously operable control circuit to control turn-on of the bidirectional conducting device, or alternatively, to apply the temperature control signal derived by the adjustable temperature sensitive means to the control means of the synchronously operable control circuit to control turn-on of the bidirectional conducting device.

26. An alternating current power control circuit including in combination at least one semiconductor load current carrying bidirectional gate controlled conducting device connected in series circuit relationship with a heating element across a pair of power supply terminals that in turn are adapted to be connected across a source of alternating current potential, synchronously operable control circuit means controlling the operation of the bidirectional conducting device comprising gating means operatively coupled to the control gate of the gate controlled bidirectional conducting device for gating on the device, means for continuously applying a low voltage direct current turn-on control signal to said gating means, first shunt means operatively coupled to the gating means for shunting the turn-on control signal with one polarity of the supply alternating current potential, second shunt means operatively coupled to the gating means for shunting the turn-on control signal with an opposite polarity of the supply alternating current potential, control means operatively coupled to at least one of the shunt means for controlling the operation of the at least one shunt means through the zero value region of the supply alternating current potential, an adjustable temperature sensitive means thermally coupled to the heating element and operatively coupled to said control means for controlling the operation thereof, and additional override control means operatively coupled to said first-mentioned control means for overriding the control of the adjustable temperature sensitive means through a limited temperature range related to the boiling temperature of water, means operatively coupled to said additional override control means for applying a first reference potential thereto, and means for deriving a second operator controlled variable magnitude reference potential operatively coupled to said additional control means for controlling the operation thereof in conjunction with the first reference potential.

27. A synchronously operable control circuit for an alternating current power circuit comprising gating means adapted to be operatively coupled to the control gate of at least one gate controlled bidirectional conducting device for gating on the device, means coupled to said gating means for continuously applying a turn-on signal to said gating means, first shunt means operatively coupled to the gating means for shunting the turn-on signal from the gating means with one polarity of a supply alternating current potential for the bidirectional gate controlled conducting device to which the synchronously operable control circuit is adapted to be connected, second shunt means operatively coupled to said gating means for shunting the gating signal from the gating means during the opposite polarity of the supply alternating current potential, control means operatively coupled to at least one of said shunt means for controlling operation of said at least one shunt means, means operatively coupled to said control means for applying a control signal thereto to control the operation of the control means through the zero value region of the supply alternating current potential, and override control means operatively coupled to said control means for additionally controlling and overriding the first-mentioned control means to provide an additional control function.

28. The combination set forth in claim 27 further characterized by a lead network interconnected between the control means and the means for applying a control signal to the control means to thereby effect an anticipatory reaction in the operation of the control means.

29. A synchronously operable control circuit for an alternating current power circuit comprising a gating transistor adapted to have an output terminal operatively coupled to the control gate of at least one bidirectional gate controlled conducting device for gating on the device, means coupled to said gating transistor for continuously applying a turn-on signal to said gating transistor, a first shunt transistor operatively coupled to said gating transistor for shunting the base-emitter of the gating transistor for one polarity of a supply alternating current potential for the bidirectional gate controlled conducting device to which the synchronously operable control circuit is adapted to be connected, a second shunt transistor operatively coupled to said gating transistor for shunting the base-emitter of the gating transistor for the opposite polarity of the supply alternating current potential, a control transistor operatively coupled to at least one of said shunt transistors for controlling the operation of said at least one shunt transistor, control signal applying means operatively coupled to said control transistor for applying a control signal to said control transistor to control the operation thereof at least during the interval that the supply alternating current potential passes through the zero value region, and an override control transistor operatively coupled to said first-mentioned control transistor for overriding and controlling the operation of said first-mentioned control transistor, means for providing a first reference potential to said override control transistor means for providing an operator controlled variable magnitude second reference potential to the override control transistor for controlling the operation of the override control transistor in conjunction with the first reference potential, and a lead network interconnected between the first-mentioned control transistor and the control signal applying means for providing an anticipatory effect to the operation of the first-mentioned control transistor.

30. The combination set forth in claim 20 wherein at least one of said synchronously operable control circuits has additional override control means for overriding and controlling the operation of the first-mentioned control means to provide an additional control function, and wherein a lead network is interposed between the first-mentioned control means and the adjustable temperature sensitive means for providing an anticipatory effect to the operation of the said first-mentioned control means.

31. The combination set forth in claim 20 wherein the synchronously operable control circuit for the heating element having the temperature sensitive means thermally coupled thereto comprises a gating transistor adapted to have an output terminal operatively coupled to the control gate of the bidirectional gate control conducting device associated with the heating element, means coupled to said gating transistor for continuously applying a turn-on signal to said gating transistor, a first shunt transistor operatively coupled to said gating transistor for shunting the base-emitter of the gating transistor for one polarity of the supply alternating current potential, a second shunt transistor operatively coupled to said gating transistor for shunting the base-emitter of the gating transistor for the opposite polarity of the supply alternating current potential, a control transistor operatively coupled to at least one of said shunt transistors for controlling the operation of said at least one shunt transistor, a lead network operatively intercoupled between the output of the temperature sensitive means and the input of the control transistor for providing an anticipatory effect to the operation of the control transistor, and an additional override control transistor operatively coupled to the first-mentioned control transistor for overriding and controlling the operation thereof, means for applying a first time varying reference potential to the additional override control transistor, and means for providing an adjustable operator controlled variable magnitude second reference potential to the additional override control transistor in conjunction with the first reference potential to thereby control its operation.

No references cited.

JOHN S. HEYMAN, *Primary Examiner.*

B. P. DAVIS, *Assistant Examiner.*